(12) United States Patent
Lee

(10) Patent No.: US 11,054,615 B2
(45) Date of Patent: Jul. 6, 2021

(54) OPTICAL LENS ASSEMBLY AND ELECTRONIC DEVICE COMPRISING SAME

(71) Applicant: Samsung Electronics Co., Ltd., Suwon-si (KR)

(72) Inventor: Ki-woo Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 112 days.

(21) Appl. No.: 16/312,529

(22) PCT Filed: Apr. 13, 2017

(86) PCT No.: PCT/KR2017/004006
§ 371 (c)(1),
(2) Date: Dec. 21, 2018

(87) PCT Pub. No.: WO2018/008833
PCT Pub. Date: Jan. 11, 2018

(65) Prior Publication Data
US 2019/0331897 A1    Oct. 31, 2019

(30) Foreign Application Priority Data
Jul. 6, 2016 (KR) .......... 10-2016-0085596

(51) Int. Cl.
| G02B 13/18 | (2006.01) |
| G02B 17/00 | (2006.01) |
| G02B 13/00 | (2006.01) |
| G02B 9/64  | (2006.01) |
| G02B 13/02 | (2006.01) |

(52) U.S. Cl.
CPC .......... *G02B 13/0045* (2013.01); *G02B 9/64* (2013.01); *G02B 13/0065* (2013.01); *G02B 13/02* (2013.01)

(58) Field of Classification Search
CPC .. G02B 13/0045; G02B 9/64; G02B 13/0065; G02B 13/02
USPC .......................................... 359/726
See application file for complete search history.

(56) References Cited

U.S. PATENT DOCUMENTS

| 7,889,436 B2* | 2/2011 | Wada ............... G02B 15/17 359/676 |
| 8,643,957 B2* | 2/2014 | Chen ............... G02B 13/0045 359/713 |
| 8,687,283 B2 | 4/2014 | Wada |
| 8,824,061 B2 | 9/2014 | Tomioka |
| 9,316,810 B2 | 4/2016 | Mercado |
| 2005/0259329 A1* | 11/2005 | Yagyu ............... G02B 15/177 359/676 |
| 2015/0253647 A1 | 9/2015 | Mercado |

(Continued)

FOREIGN PATENT DOCUMENTS

| JP | 2010-152318 A | 7/2010 |
| JP | 2013-092554 A | 5/2013 |

(Continued)

*Primary Examiner* — William Choi
(74) *Attorney, Agent, or Firm* — Jefferson IP Law, LLP

(57) ABSTRACT

Provided are an optical lens assembly and an electronic apparatus including the same, according to various embodiments. The optical lens assembly includes a bending portion including a reflection surface for reflecting light and at least one surface having a refractive power, and a plurality of lenses arranged between the bending portion and an image plane. Other embodiments are possible.

14 Claims, 27 Drawing Sheets

(56) References Cited

U.S. PATENT DOCUMENTS

2016/0044250 A1  2/2016  Shabtay et al.
2016/0377842 A1  12/2016  Choi et al.

FOREIGN PATENT DOCUMENTS

KR  10-2015-0084631 A  7/2015
WO  2015/134173 A1  9/2015

* cited by examiner

OPTICAL LENS ASSEMBLY AND ELECTRONIC DEVICE COMPRISING SAME

CROSS-REFERENCE TO RELATED APPLICATION(S)

This application is a U.S. National Stage application under 35 U.S.C. § 371 of an International application number PCT/KR2017/004006, filed on Apr. 13, 2017, which is based on and claimed priority of a Korean patent application number 10-2016-0085596, filed on Jul. 6, 2016, in the Korean Intellectual Property Office, the disclosure of which is incorporated by reference herein in its entirety.

TECHNICAL FIELD

The disclosure relates to an optical lens assembly and an apparatus, and more particularly, to an optical lens assembly provided in an electronic apparatus, and an electronic apparatus having the optical lens assembly.

BACKGROUND ART

The variety of services and add-ons provided by electronic apparatuses has gradually expanded. Electronic apparatuses, for example, mobile devices or user devices, may provide various services through various sensor modules. The electronic apparatuses may provide multimedia services, for example, photo services or video services. As the use of electronic apparatuses increases, the use of cameras functionally connected to the electronic apparatuses has also gradually increased. The performance and/or resolution of cameras of electronic apparatuses have improved according to users' demand. A variety of types of photos such as landscapes, portraits, or selfies can be taken by using the camera of an electronic apparatus. Such multimedia, for example, photos or videos, can be shared through social network sites or other media.

A method of arranging a wide camera and a telephoto camera as a dual module has been suggested as a method of obtaining a high resolution zoom image in recent compact mobile devices. However, due to a long focus telephoto lens needed to obtain a high-magnification zoom image, it is difficult to miniaturize a high-magnification telephoto lens camera module.

DESCRIPTION OF EMBODIMENTS

Technical Problem

The increased use of photographing apparatuses in compact mobile devices has led to an increased demand for miniaturization and high magnification of photographing apparatuses. To acquire a high-quality, high-magnification zoom image via a compact mobile device, a telephoto lens having a long focal length needs to be miniaturized.

One or more embodiments include a telephoto optical lens assembly, for example, of an electronic apparatus (e. g., a portable terminal).

Furthermore, one or more embodiments include an electronic apparatus including, for example, a telephoto optical lens assembly.

Furthermore, one or more embodiments include an electronic apparatus including a plurality of optical lens assemblies and capable of multi-module zoom photographing.

Solution to Problem

In accordance with an aspect of the disclosure, an optical lens assembly includes a bending portion including a reflection surface for reflecting light and at least one surface having refractive power, and a plurality of lenses arranged between the bending portion and an image plane, wherein the optical lens assembly satisfies following inequalities:

$$0.06 \leq Id/f \leq 0.2,$$

$$TTL/f \leq 1.0, \text{ and}$$

$$ttla/ttlb \leq 0.4,$$

wherein "Id" denotes an image height, "f" denotes a total focal length of the optical lens assembly, "TTL" denotes a total length of the optical lens assembly, "ttla" denotes a distance along an optical axis from an object side surface to the reflection surface of the bending portion, and "ttlb" denotes a distance along the optical axis from the reflection surface of the bending portion to the image plane.

In accordance with another aspect of the disclosure, an optical lens assembly includes a bending portion configured to bend an optical path by reflecting light, and six or more lenses arranged between the bending portion and an image plane, wherein, when a distance from an object side surface of a lens located closest to an object side among the six or more lenses to an image plane is TTL, and a focal length is f, the optical lens assembly satisfies relation $0.75 \leq TTL/f \leq 1.0$.

In accordance with another aspect of the disclosure, an electronic apparatus includes a first optical assembly having a first field of view, and a second optical assembly having a second field of view greater than the first field of view, wherein the first optical assembly includes a bending portion including a reflection surface for reflecting light and at least one surface having refractive power, and a plurality of lenses arranged between the bending portion and an image plane, wherein the first optical lens assembly satisfies following inequalities:

$$0.06 \leq Id/f \leq 0.2,$$

$$TTL/f \leq 1.0, \text{ and}$$

$$ttla/ttlb \leq 0.4,$$

wherein "Id" denotes an image height, "f" denotes a total focal length of the optical lens assembly, "TTL" denotes a total length of the optical lens assembly, "ttla" denotes a distance along an optical axis from an object side surface to the reflection surface of the bending portion, and "ttlb" denotes a distance along the optical axis from the reflection surface of the bending portion to the image plane.

Advantageous Effects of Disclosure

An optical lens assembly according to various embodiments may include a compact and thin telephoto lens to obtain a high quality, high magnification zoom image in a compact mobile device. An effect, such as a continuous optical zoom function, may be achieved by using a wide lens system and a telephoto lens system in a multi-module camera. As a wide image captured by the wide lens system and a telephoto image captured by the telephoto lens system are synthesized, an image of a middle magnification between a wide angle and a telephoto angle may be obtained. As such, since a zoom effect may be obtained by using a multi-module camera, a relatively compact zoom lens may be provided compared to a case of using an optical zoom lens.

MODE OF DISCLOSURE

Figure 1:
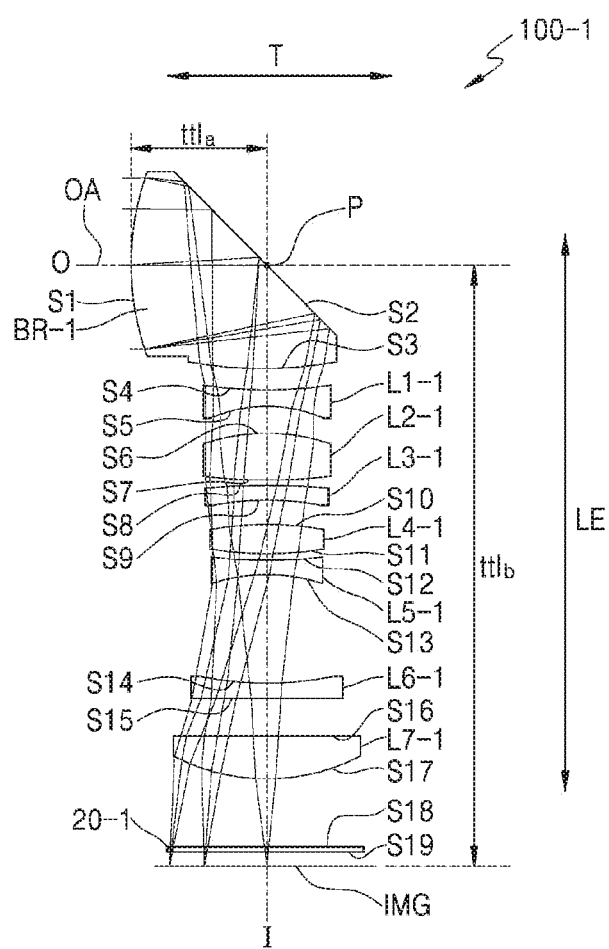
FIG. 1 illustrates an optical lens assembly of a first numerical embodiment from among various embodiments.

As the disclosure allows for various changes and numerous embodiments, optical lens assemblies according to embodiments and an electronic apparatus including the same will be illustrated in the drawings and described in detail in the written description. However, this is not intended to limit the disclosure to particular modes of practice, and it is to be appreciated that various modifications, equivalents, and/or alternatives that do not depart from the spirit and technical scope of the disclosure are encompassed in the disclosure. In the description of the disclosure, certain detailed explanations of the related art are omitted when it is deemed that they may unnecessarily obscure the essence of the disclosure. Throughout the drawings, like reference numerals denote like elements.

In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

In the present specification, expressions such as "A or B," "at least one of A and/or B," or "at least one or more of A and/or B" may include all available combinations of items listed together. For example, expressions such as "A or B," "at least one of A and B," or "at least one of A or B" may signify all cases of (1) including at least one A, (2) including at least one B, or (3) including both of at least one A and at least one B.

Terms such as "first" and "second" are used herein merely to describe a variety of constituent elements, but the constituent elements are not limited by the terms. Such terms are used only for the purpose of distinguishing one constituent element from another constituent element. For example, without departing from the right scope of the disclosure, a first constituent element may be referred to as a second constituent element, and vice versa.

In the present specification, when a constituent element, e.g., a first constituent element, is "(operatively or communicatively) coupled with/to" or is "connected to" another constituent element, e.g., a second constituent element, the constituent element contacts or is connected to the other constituent element directly or through at least one of other constituent elements, e.g., a third constituent element. Conversely, when a constituent element, e.g., a first constituent element, is described to "directly connect" or to be "directly connected" to another constituent element, e.g., a second constituent element, the constituent element should be construed to be directly connected to another constituent element without any other constituent element, e.g., a third constituent element, interposed therebetween. Other expressions, such as, "between" and "directly between", describing the relationship between the constituent elements, may be construed in the same manner.

In the present specification, the expression "configured to" may be interchangeable with an expression such as "suitable for", "having the capacity to", "designed to", "adapted to", "made to", or "capable of". The expression "configured to" does not necessarily signify one that is "specifically designed to" in hardware. Instead, in some situations, the expression "configured to" may signify one that is "capable of" performing a function with other device or parts. For example, an expression "a processor configured to perform functions A, B, and C" may signify an exclusive processor, for example, an embedded processor, for performing the functions or a generic-purpose processor, for example, a CPU or an application processor, capable of performing the functions by executing one or more software programs stored in a memory device.

The terms used in the disclosure have been selected from currently widely used general terms in consideration of the functions in the disclosure. However, the terms may vary according to the intention of one of ordinary skill in the art, case precedents, and the advent of new technologies. Also, for special cases, meanings of the terms selected by the applicant are described in detail in the description section. Accordingly, the terms used in the disclosure are defined based on their meanings in relation to the contents discussed throughout the specification, not by their simple meanings.

The term "electronic apparatus" according to various embodiments of the disclosure may include at least one of smartphones, tablet personal computers, mobile phones, video phones, e-book readers, desktop personal computers (PCs), laptop personal computers (PCs), netbook computers, workstations, servers, personal digital assistants (PDAs), portable multimedia players (PMPs), MP3 players, mobile medical devices, cameras, and wearable devices. According to various embodiments, a wearable device may include at least one of an accessory type, e.g., watches, rings, bracelets, anklets, necklaces, glasses, contact lenses, or head-mounted devices (HMD), a fabric or garment integrated type, e.g., electronic apparel, a body attached type, e.g., skin pads or tattoos, or a body implantable type, e.g., implantable circuits.

In various embodiments, the electronic apparatus may be home appliances. Home appliances may include at least one of, for example, televisions, digital video disk (DVD) players, audio systems, refrigerators, air conditioners, vacuum cleaners, ovens, microwaves, washing machines, air cleaners, set-top boxes, home automation control panels, security control panels, TV boxes such as Samsung's HomeSync™, Apple's TV™, or Google's TV™, game consoles such as Xbox™ or PlayStation™, electronic dictionaries, electronic keys, camcorders, and electronic photo frames.

In another embodiment, the electronic apparatus may include at least one of various medical devices such as various portable medical measuring instruments including a blood glucose meter, a heart rate meter, a blood pressure meter, or a temperature measuring instrument, magnetic resonance angiography (MRA), magnetic resonance imaging (MRI), computed tomography (CT), imaging apparatuses, or ultrasonic devices, navigation systems, global navigation satellite systems (GNSS), event data recorders (EDR), flight data recorders (FDR), automotive infotainment devices, marine electronic equipment such as a marine navigation system or a gyro compass, avionics, security devices, automobile head units, industrial or home robots, automotive teller's machines of financial institutions, points of sales (POS) of stores, and Internet of Things (IoT) devices such as light bulbs, various sensors, electric or gas meters, sprinkler devices, fire alarms, thermostats, street lights, toasters, exercise equipment, hot water tanks, heaters, boilers, etc.

In various embodiments, the electronic apparatus may include at least one of a part of furniture or a building/structure, an electronic board, an electronic signature receiving device, a projector, and a variety of measuring instruments, such as, a water, electricity, gas, or radio wave measuring instrument, etc. In various embodiments, the electronic apparatus may be one of the above-described devices and a combination thereof. In various embodiments, the electronic apparatus may be a flexible electronic apparatus. Furthermore, the electronic apparatus according to the present embodiment is not limited to the above-described devices, and may include a new electronic apparatus according to the development of technologies.

In the specification, the term "user" may indicate a user who uses the electronic apparatus or an apparatus that uses the electronic apparatus, for example, an artificial intelligent electronic apparatus.

Hereinafter, an optical lens assembly and an apparatus having the same, according to various embodiments, are described below in detail with reference to the accompanying drawings.

FIG. 1 illustrates an optical lens assembly 100-1 of a first numerical embodiment from among various embodiments.

According to various embodiments, the optical lens assembly 100-1 may include a bending portion BR-1, for bending an optical path, and a plurality of lenses. The bending portion BR-1 may include a reflection surface S2, for reflecting light, and at least one surface having refractive power. The surface having refractive power may denote a surface having curvature. A surface having positive refractive power may be a convex surface. For example, the bending portion BR-1 may include an object side surface S1 that is convex towards an object side O and an image side surface S3 that is convex towards an image side I. The bending portion BR-1 may have positive refractive power. Although an example in which the bending portion BR-1 includes a surface having refractive power at each of the object side surface S1 and the image side surface S3 is illustrated, only one of the object side surface S1 and the image side surface S3 may be a surface having refractive power and the other surface may be a flat surface. The lenses may be arranged between the bending portion BR-1 and an image plane IMG.

In the following description of a configuration of each lens, the image side may denote, for example, a direction in which the image plane IMG on which an image is formed, and the object side may denote a direction in which an object exists. Furthermore, the "object side surface" of a lens may denote, for example, a lens surface facing the object with respect to an optical axis OA, and the "image side surface" may denote, for example, a lens surface facing the image plane IMG with respect to the optical axis OA. The image plane IMG may be, for example, a photographing device surface or an image sensor surface. An image sensor may include a sensor such as a complementary metal-oxide semiconductor (CMOS) image sensor or a charge-coupled device (CCD) image sensor. The image sensor is not limited thereto, and may be, for example, a device that converts an image of the object into an electric image signal.

According to various embodiments, the lenses may include, for example, six or more lenses. According to various embodiments, the lenses may include a first lens L1-1, a second lens L2-1, a third lens L3-1, a fourth lens L4-1, a fifth lens L5-1, a sixth lens L6-1, and a seventh lens L7-1, which are arranged from the object side O towards the image side I. The first lens L1-1 may have negative refractive power. The first lens L1-1 may include an image side surface S5 that is concave towards the image side I. The second lens L2-1 may have positive refractive power. The second lens L2-1 may be a biconvex lens. The second lens L2-1 and the third lens L3-1 may perform focusing and anti-hand shaking.

The first lens L1-1 that is located closest to the object side O among the lenses may have an Abbe number less than 35, and the second lens L2-1 that is located next to the first lens L1-1 may have an Abbe number greater than or equal to 50. The third lens L3-1 may have an Abbe number less than 35. According to various embodiments, all of the lenses may be plastic lenses. The bending portion BR-1 may include plastic.

The seventh lens L7-1 located closest to the image side I may have positive refractive power. The seventh lens L7-1 may be a meniscus lens that is convex towards the image side I. The sixth lens L6-1 may have negative refractive power. The sixth lens L6-1 may be a biconcave lens.

According to various embodiments, at least one optical element 20-1 may be provided between the seventh lens L7-1 and the image plane IMG. The optical element 20-1 may include at least one of, for example, a low pass filter, an infrared (IR)-cut filter, or a cover glass. For example, when an IR-cut filter is provided as the optical element, visible light is transmitted, and an IR ray is emitted to the outside, thereby preventing the IR ray from travelling to the image plane. However, the optical lens assembly may be configured without the optical element.

Figure 4:
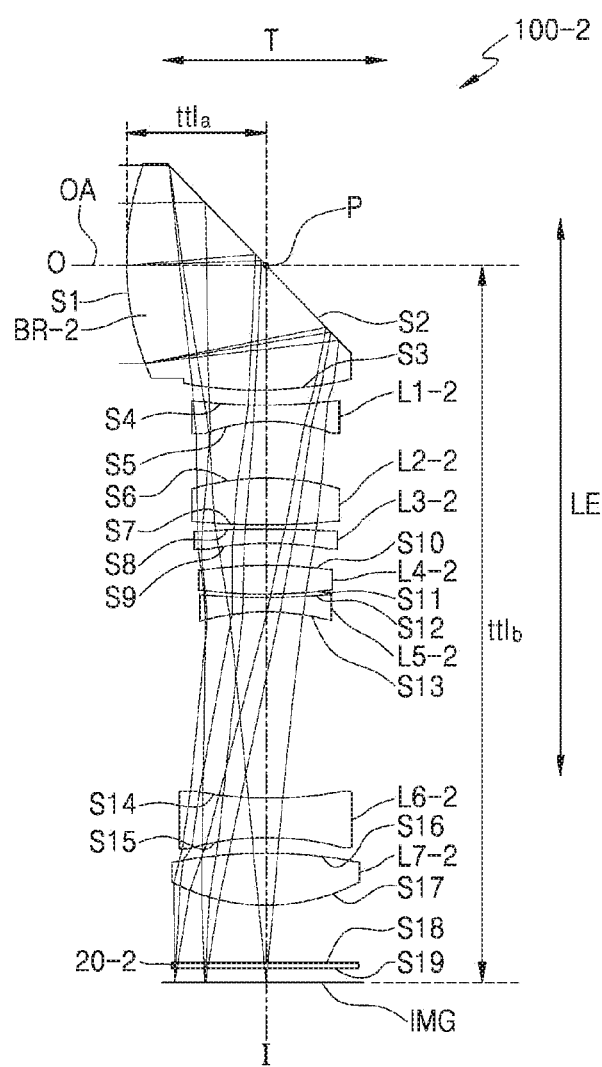
FIG. 4 illustrates an optical lens assembly according to a second numerical embodiment from among various embodiments.

FIG. 4 illustrates an optical lens assembly 100-2 according to a second numerical embodiment from among various embodiments.

According to various embodiments, the optical lens assembly 100-2 may include a bending portion BR-2, for bending an optical path, and a plurality of lenses. The bending portion BR-2 may include the reflection surface S2, for reflecting light, and at least one surface having refractive power. The surface having refractive power may denote a surface having curvature. According to various embodiments, the lenses may include a first lens L1-2, a second lens L2-2, a third lens L3-2, a fourth lens L4-2, a fifth lens L5-2, a sixth lens L6-2, and a seventh lens L7-2, which are arranged from the object side O towards the image side I. The first lens L1-2 may have negative refractive power. The first lens L1-2 may include the image side surface S5 that is concave towards the image side I. The second lens L2-2 may have positive refractive power. The seventh lens L7-2 may have positive refractive power. In the present embodiment, descriptions of constituent elements similar to those of the above-described first numerical embodiment are omitted. The seventh lens L7-2 may be a biconvex lens. The sixth lens L6-2 may have negative refractive power. The sixth lens L6-2 may be a biconcave lens.

Figure 6:
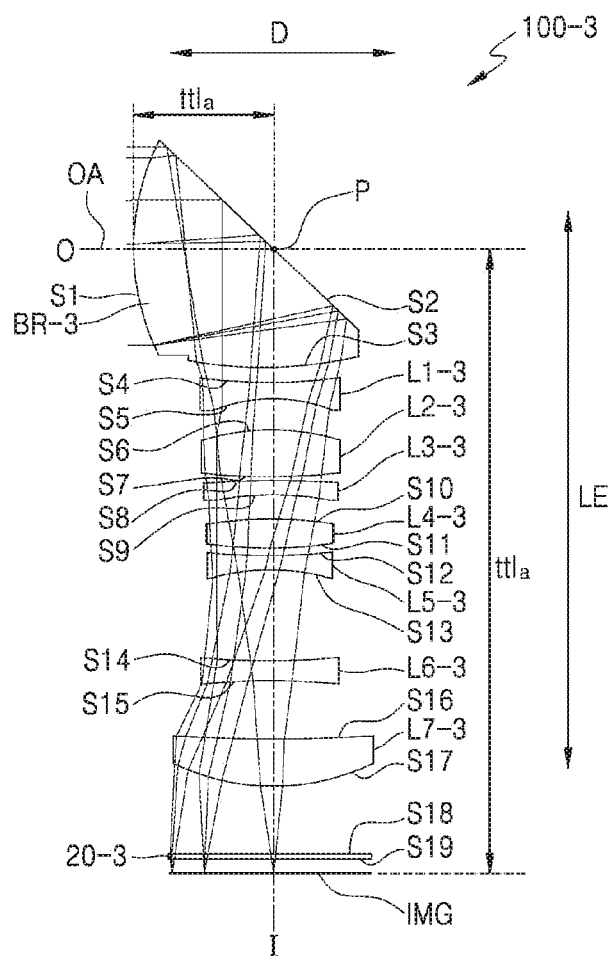
FIG. 6 illustrates an optical lens assembly according to a third numerical embodiment from among various embodiments.

FIG. 6 illustrates an optical lens assembly 100-3 according to a third numerical embodiment from among various embodiments.

According to various embodiments, the optical lens assembly 100-3 may include a bending portion BR-3, for bending an optical path, and a plurality of lenses. The bending portion BR-3 may include the reflection surface S2, for reflecting light, and at least one surface having refractive power. According to various embodiments, the lenses may include a first lens L1-3, a second lens L2-3, a third lens L3-3, a fourth lens L4-3, a fifth lens L5-3, a sixth lens L6-3, and a seventh lens L7-3, which are arranged from the object side O towards the image side I. In the present embodiment, descriptions of the constituent elements similar to those of the above-described first numerical embodiment are omitted.

Figure 8:
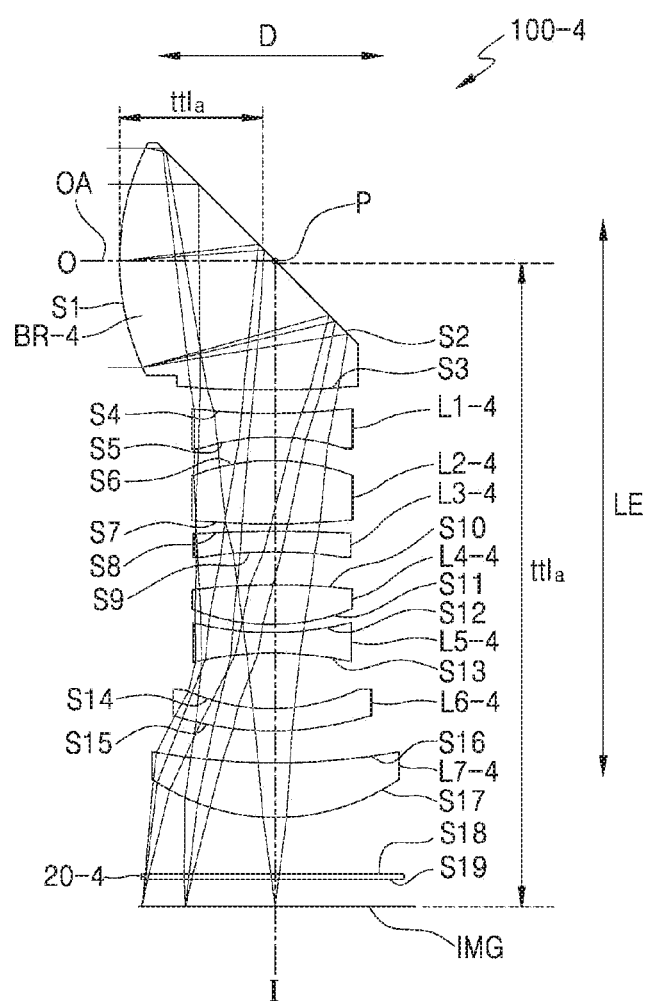
FIG. 8 illustrates an optical lens assembly according to a fourth numerical embodiment from among various embodiments.

FIG. 8 illustrates an optical lens assembly 100-4 according to a fourth numerical embodiment from among various embodiments.

According to various embodiments, the optical lens assembly 100-4 may include a bending portion BR-4, for bending an optical path, and a plurality of lenses. The bending portion BR-4 may include the reflection surface S2 for reflecting light, and at least one surface having refractive power. The surface having refractive power may denote a surface having curvature. According to various embodiments, the lenses may include a first lens L1-4, a second lens L2-4, a third lens L3-4, a fourth lens L4-4, a fifth lens L5-4, a sixth lens L6-4, and a seventh lens L7-4, which are arranged from the object side O towards the image side I. The sixth lens L6-4 may be a meniscus lens that is convex towards the object side O. The seventh lens L7-4 may be a meniscus lens that is convex towards the object side O. In the present embodiment, descriptions of the constituent elements similar to those of the above-described first numerical embodiment are omitted.

Figure 10:
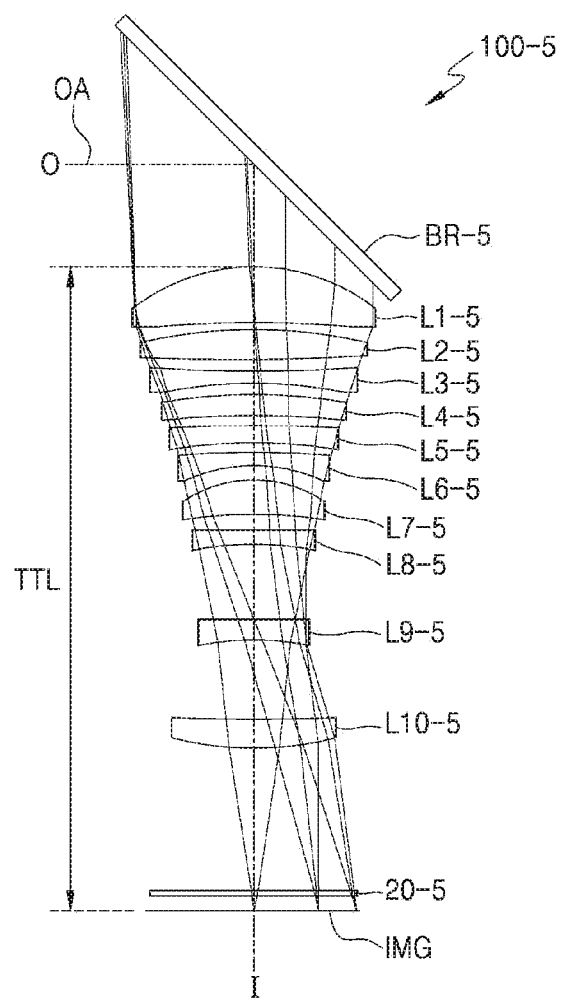
FIG. 10 illustrates an optical lens assembly according to a fifth numerical embodiment from among various embodiments.

FIG. 10 illustrates an optical lens assembly 100-5 according to a fifth numerical embodiment from among various embodiments.

According to various embodiments, the optical lens assembly 100-5 may include a bending portion BR-5, for bending an optical path, and a plurality of lenses. The bending portion BR-5 may include a reflection mirror or a prism for reflecting light. When the bending portion BR-5 is a prism, the bending portion BR-5 may be configured not to have refractive power. The lenses may include, for example, six or more lenses. According to various embodiments, the lenses may include a first lens L1-5, a second lens L2-5, a third lens L3-5, a fourth lens L4-5, a fifth lens L5-5, a sixth lens L6-5, a seventh lens L7-5, an eighth lens L8-5, a ninth lens L9-5, and a tenth lens L10-5, which are arranged from the object side O towards the image side I.

The first lens L1-5 may have positive refractive power. The first lens L1-5 may include the object side surface S1 that is convex towards the object side O. The second lens L2-5 may have positive refractive power. The second lens L2-5 may be a biconvex lens.

Each of the first lens L1-5 located closest to the object side O among the lenses and the second lens L2-5 next to the first lens L1-5 may have an Abbe number greater than or equal to 50. According to various embodiments, all the lenses may include plastic lens.

According to various embodiments, the seventh lens L7-5 may have positive refractive power, and the eighth lens L8-5 may have negative refractive power. In the present embodiment, the seventh lens L7-5 and the eighth lens L8-5 may perform focusing and anti-hand shaking.

According to various embodiments, the tenth lens L10-5 located closest to the image side I may have positive refractive power. The tenth lens L10-5 may have the image side surface S5 convex towards the image side I. The tenth lens L10-5 may be a biconvex lens. The ninth lens L9-5 may have negative refractive power. The ninth lens L9-5 may be a biconcave lens.

According to various embodiments, at least one optical element 20-5 may be provided between the tenth lens L10-5 and the image plane IMG.

Figure 12:
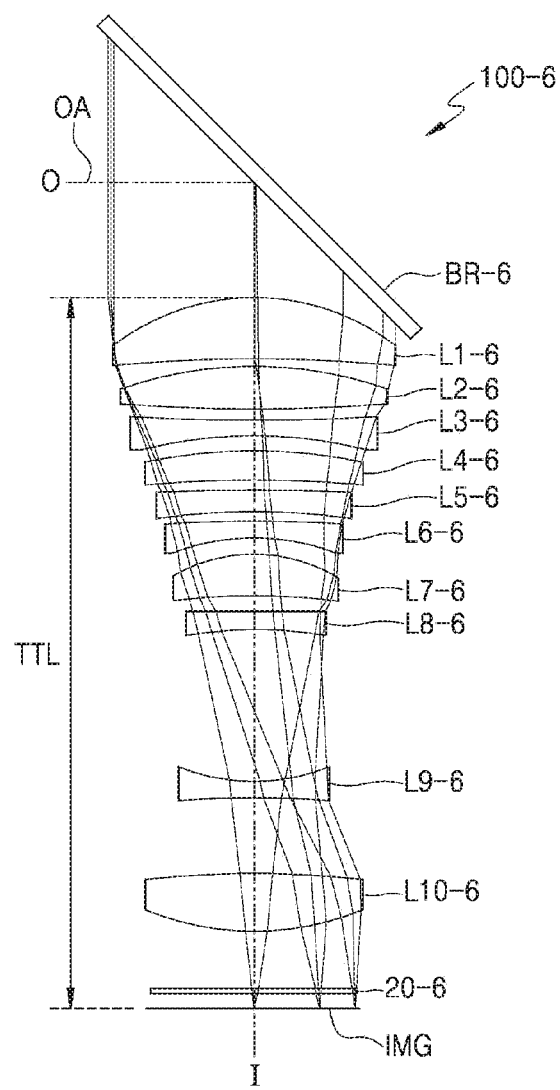
FIG. 12 illustrates an optical lens assembly according to a sixth numerical embodiment from among various embodiments.

FIG. 12 illustrates an optical lens assembly 100-6 according to a sixth numerical embodiment from among various embodiments.

According to various embodiments, the optical lens assembly 100-6 may include a bending portion BR-6, for bending an optical path, and a plurality of lenses. The bending portion BR-6 may include a reflection mirror or a prism for reflecting light. The lenses may include, for example, six or more lenses. According to various embodiments, the lenses may include a first lens L1-6, a second lens L2-6, a third lens L3-6, a fourth lens L4-6, a fifth lens L5-6, a sixth lens L6-6, a seventh lens L7-6, an eighth lens L8-6, a ninth lens L9-6, and a tenth lens L10-6, which are arranged from the object side O towards the image side I.

In the present embodiment, descriptions on the constituent elements similar to those of the above-described fifth numerical embodiment are omitted.

Figure 14:
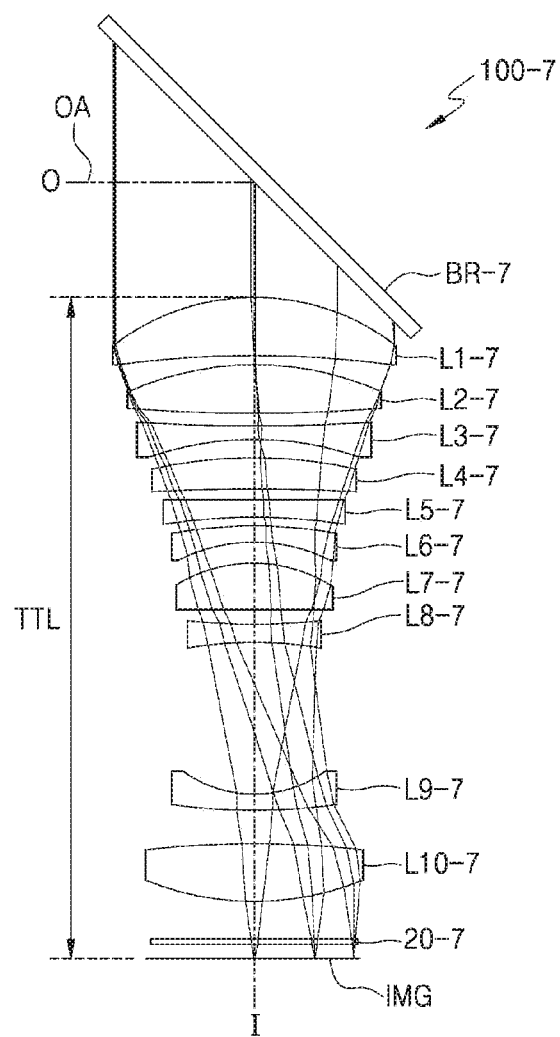
FIG. 14 illustrates an optical lens assembly according to a seventh numerical embodiment from among various embodiments.

FIG. 14 illustrates an optical lens assembly 100-7 according to a seventh numerical embodiment from among various embodiments.

According to various embodiments, the optical lens assembly 100-7 may include a bending portion BR-7, for bending an optical path, and a plurality of lenses. The bending portion BR-7 may include a reflection mirror or a prism for reflecting light. The lenses may include, for example, six or more lenses. According to various embodiments, the lenses may include a first lens L1-7, a second lens L2-7, a third lens L3-7, a fourth lens L4-7, a fifth lens L5-7, a sixth lens L6-7, a seventh lens L7-7, an eighth lens L8-7, a ninth lens L9-7, and a tenth lens L10-7, which are arranged from the object side O towards the image side I.

According to various embodiments, the tenth lens L10-7 located closest to the image side I may have positive refractive power. The tenth lens L10-7 may be a biconvex lens. The ninth lens L9-7 may have negative refractive power. The ninth lens L9-7 may be a meniscus lens that is convex towards the image side I. In the present embodiment, descriptions of the constituent elements similar to those of the above-described fifth numerical embodiment are omitted.

The optical lens assembly according to various embodiments may satisfy the following inequalities and equation. The following inequalities and equation are described with reference to the optical lens assembly 100-1 according to the first numerical embodiment shown in FIG. 1. However, the following inequalities and equations may be identically applied to the other numerical embodiments.

$$0.06 \leq Id/f \leq 0.2 \qquad \text{<Inequality 1>}$$

Here, "Id" denotes an image height, and "f" denotes a focal length of an optical lens assembly.

Figure 2:
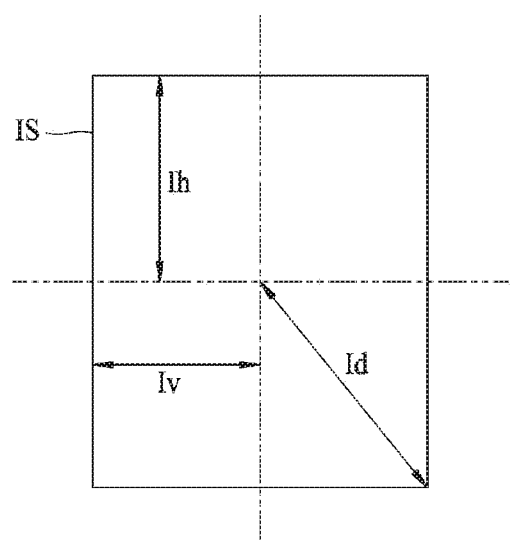
FIG. 2 illustrates an image sensor of various dimensions.

FIG. 2 illustrates an image sensor IS of various dimensions, in which the half of a diagonal length of the image sensor IS is represented by "Id", the half of a vertical length of the image sensor IS is represented by "Ih", and the half of a horizontal length of the image sensor IS is represented by "Iv". The Id of the image sensor IS denotes an image height.

Inequality 1 defines a ratio of a focal length to the image height Id. In a compact mobile device, to obtain a high-quality, high-magnification zoom image, a plurality of a wide lens system and a telephoto lens system are arranged, and thus a zoom image may be obtained from a difference between images of the two lens systems. In order to obtain an image of a high zoom magnification, it is better as a ratio (telephoto ratio) of a focal length to the image height Id of the telephoto lens system decreases. When a ratio (Id/f) satisfies Inequality 1, the zoom magnification may be increased. According to various embodiments, the image height Id may be less than or equal to about 4 mm.

The optical lens assembly according to various embodiments may satisfy the following inequality.

$$TTL/f \leq 1.0 \qquad \text{<Inequality 2>}$$

Here, "TTL" denotes a total length of an optical lens assembly.

As in the first, second, third, and fourth numerical embodiments, when a bending portion having refractive power is used, TTL may denote a distance from an object side surface of the bending portion to an image plane. As in the fifth, sixth, and seventh numerical embodiments, when a bending portion having no refractive power is used, TTL may denote a distance from an object side surface of the first lens located closest to the object side to an image plane.

"(TTL/f)" may denote a telephoto ratio. When the telephoto ratio (TTL/f) satisfies Inequality 2, the thickness of an optical lens assembly may be decreased, and thus an overall size of the optical lens assembly may be reduced and miniaturized.

The optical lens assembly according to various embodiments may satisfy the following inequality.

$$0.75 \leq TTL/f \leq 1.0 \qquad \text{<Inequality 2-1>}$$

The optical lens assembly according to various embodiments may satisfy the following inequality. Inequality 3 may be applied the first, second, third, and fourth numerical embodiments.

$$ttla/ttlb \leq 0.4 \qquad \text{<Inequality 3>}$$

Here, "ttla" may denote a distance along the optical axis from the object side surface S1 to the reflection surface S2 of the bending portion BR-1, and "ttlb" may denote a distance along the optical axis from the reflection surface S2 of the bending portion BR-1 to the image plane IMG. When a point where the reflection surface S2 meets the optical axis OA is P, the ttla may denote a distance from a vertex of the object side surface S1 of the bending portion BR-1 to the point P. Referring to FIG. 1, a thickness direction and a length direction of the optical lens assembly 100-1 are represented by T and LE, respectively. The ttla may denote the thickness of the optical lens assembly 100-1, and the ttlb may denote the length of the optical lens assembly 100-1.

Inequality 3 is to facilitate installation of the optical lens assembly according to various embodiments on a thin device such as a compact mobile device (a mobile phone or a tablet). When a ratio (ttla/ttlb) satisfies Inequality 3, a high-magnification telephoto lens may be installed while maintain design of a compact mobile device.

The optical lens assembly according to various embodiments may have a narrow field of view, may enhance telephoto performance, and may be miniaturized. The narrow field of view may include a field of view that is, for example, less than or equal to 23°. The telephoto performance may include at least some functions related to a telephoto lens.

The optical lens assembly according to various embodiments may have a compact size, telephoto performance, and a high resolution. The optical lens assembly may be mounted in, for example, mobile terminals, digital cameras or camcorders, personal computers, or other electronic products.

The optical lens assembly according to various embodiments may have the same effect as an actual continuous optical zoom function by arranging multiple compact lens modules to obtain a high-quality, high-magnification zoom image in a compact mobile device. For example, a wide lens module and a telephoto lens module according to various embodiments are provided, and a wide image and a telephoto image are captured. Then, by synthesizing the two images, a middle magnification image between a wide angle and a telephoto angle may be obtained without deterioration of image quality. Thus, a zoom effect between a wide angle position and a telephoto position may be obtained. By using a multi-module, an optical system may be configured to be thinner than an actual optical zoom lens, and a high-magnification digital zoom image may be provided.

An aspherical surface used in the optical lens assembly according to various embodiments is defined as follows.

The shape of an aspherical surface may be expressed by the following equation, assuming that an optical axis direction is an x axis and a direction perpendicular to the optical axis direction is a y axis, and that a proceeding direction of a light ray is set to be positive. Here, "x" may denote a distance from the vertex of a lens in the optical axis direction, "y" may denote a distance in a direction perpendicular to the optical axis, "K" may denote a conic constant, "A", "B", "C", "D" . . . may denote aspherical surface coefficients, and "c" may denote a reciprocal (1/R) of a radius of curvature at the vertex of a lens.

$$x = \frac{cy^2}{1 + \sqrt{1 - (K+1)c^2y^2}} + Ay^4 + By^6 + Cy^8 + Dy^{10} + \ldots \quad \langle\text{Equation 4}\rangle$$

In the disclosure, an optical lens assembly may be implemented through numerical embodiments according to various designs as follows.

In a data table according to each numerical embodiment, lens surface symbols (S1, S2, S3 . . . Sn; where n is a natural number) are sequentially assigned in a line from the object side O towards the image side I. In the drawings, the lens surface symbols are indicated only for the optical lens assemblies according to the embodiments illustrated in FIGS. 1, 4, 6, and 8, and are omitted for the other figures. In the tables, "f" may denote a focal length of an optical lens assembly, "Fno" may denote an F number, "FOV" may denote a field of view, "R" may denote a radius of curvature, "Dn" may denote a thickness of a lens or an air gap between lenses, "Nd" may denote a refractive index, and "Vd" may denote an Abbe number.

First Numerical Embodiment

FIG. 1 illustrates an optical lens assembly of a first numerical embodiment from among various embodiments. Table 1 shows, for example, design data according to the first numerical embodiment.

TABLE 1

| Lens surface | Aspherical surface type | R (mm) | Dn (mm) | Nd | Vd | Reflection and refraction properties |
|---|---|---|---|---|---|---|
| S1 | aspherical surface | 5.58927 | 3.02 | 1.5348 | 55.7 | refraction |
| S2 | spherical surface | Infinity | −2.60 | 1.5348 | 55.7 | reflection |
| S3 | aspherical surface | 10.09836 | −0.43 | | | refraction |
| S4 | aspherical surface | 13.33849 | −0.40 | 1.614200 | 25.6 | refraction |
| S5 | aspherical surface | −3.92246 | −0.65 | | | refraction |
| S6 | aspherical surface | −4.48887 | −1.06 | 1.5441 | 56.1 | refraction |
| S7 | aspherical surface | 15.24012 | −0.15 | | | refraction |
| S8 | aspherical surface | −18.15735 | −0.33 | 1.614200 | 26 | refraction |
| S9 | aspherical surface | −7.59935 | −0.60 | | | refraction |
| S10 | aspherical surface | −9.79838 | −0.65 | 1.614425 | 26 | refraction |
| S11 | aspherical surface | 8.77845 | −0.15 | | | refraction |
| S12 | aspherical surface | 7.17387 | −0.33 | 1.5441 | 56.1 | refraction |
| S13 | aspherical surface | −3.72734 | −2.62 | | | refraction |
| S14 | aspherical surface | 10.14397 | −0.38 | 1.614425 | 26 | refraction |
| S15 | aspherical surface | −44.01243 | −0.82 | | | refraction |
| S16 | aspherical surface | 108.20073 | −0.99 | 1.614200 | 26 | refraction |
| S17 | aspherical surface | 6.24029 | −1.50 | | | refraction |
| S18 | spherical surface | Infinity | −0.11 | 1.516800 | 64 | refraction |
| S19 | spherical surface | Infinity | −0.40 | | | refraction |

In Table 1, the sign of the radius of curvature and the sign of a lens thickness (or interval between lenses) before the reflection surface S2 of the bending portion BR-1 may be set to be opposite to those after the reflection surface S2.

Table 2 shows aspherical surface coefficients according to the first numerical embodiment.

TABLE 2

| Lens surface | K | A | B | C | D |
|---|---|---|---|---|---|
| S1 | −0.267242 | −8.8648E−05 | −4.8955E−06 | 2.2939E−07 | −2.0129E−08 |
| S3 | −3.16128 | −6.8012E−04 | −2.5969E−05 | 3.8471E−06 | 1.7469E−08 |
| S4 | −1 | 3.0037E−04 | −2.4491E−05 | −2.2438E−05 | 2.2883E−06 |
| S5 | −0.085802 | 4.9315E−04 | 2.5685E−04 | −4.5580E−05 | 1.4554E−06 |
| S6 | −0.289601 | 4.4381E−04 | −8.0864E−05 | 7.0734E−06 | 2.1722E−06 |
| S7 | −8.879248 | −2.3609E−04 | −1.3099E−04 | 3.0196E−05 | −5.1557E−07 |
| S8 | −19.733233 | −8.2181E−04 | 1.3540E−04 | 2.2848E−05 | −7.3714E−06 |
| S9 | −0.321756 | −5.7970E−04 | 6.9978E−05 | 5.0612E−05 | −1.2414E−05 |
| S10 | 7.996771 | 7.2339E−04 | 4.3631E−04 | −1.1289E−04 | −2.4479E−05 |
| S11 | −7.750137 | 2.2939E−04 | −7.5224E−05 | −8.1078E−05 | 2.6376E−05 |
| S12 | −3.534329 | −2.2875E−03 | −1.6422E−04 | 8.6680E−08 | 5.6716E−05 |
| S13 | 0.120349 | 1.5630E−04 | 2.0079E−04 | −8.4941E−06 | −2.2632E−05 |
| S14 | −13.60563 | 5.1148E−03 | 1.2595E−03 | −2.5593E−05 | −5.1284E−05 |

TABLE 2-continued

| Lens surface | K | A | B | C | D |
|---|---|---|---|---|---|
| S15 | −10 | −4.0299E−03 | 1.1918E−03 | −8.0899E−05 | −1.0095E−05 |
| S16 | 15 | 1.7149E−03 | −7.9732E−04 | 1.1624E−04 | −6.3331E−06 |
| S17 | 2.936977 | 7.7617E−03 | −1.0540E−03 | 7.3099E−05 | −4.9860E−06 |

The optical lens assembly 100-1 of the first numerical embodiment from among various embodiments may include the reflection surface S2 for bending an optical path, the object side surface S1 having positive refractive power, and the bending portion BR-1 having the image side surface S3 having positive refractive power, and further include seven lenses. The bending portion BR-1 has positive refractive power and may include a material having an Abbe number of about 55.7. The optical lens assembly 100-1 of the first numerical embodiment has the ratio (Id/f) of about 0.135 and the telephoto ratio (TTL/f) of about 0.93, and may appropriately correct chromatic aberration. The light refracted by the object side surface S1 of the bending portion BR-1 is reflected by the reflection surface S2 and proceeds towards the first lens L1-1 along an optical path bent by the image side surface S3. As the object side surface S1 of the bending portion BR-1 and the image side surface S3 are convex, the ttla that determines the thickness of a camera module may be set to be relatively small. The camera module may be miniaturized by setting the ratio (ttla/ttlb) to be 0.213. As the first lens L1-1 has negative refractive power and the second lens L2-1 has positive refractive power, spherical aberration and coma aberration occurring due to the properties of a telephoto lens having a relatively long focal length may be effectively reduced and thus high resolution may be secured. The first lens L1-1 has an Abbe number of about 25.6, and thus the chromatic aberration of a telephoto lens may be effectively reduced.

The second lens L2-1 may have positive refractive power and an Abbe number greater than 50, and the third lens L3-1 may have negative refractive power and an Abbe number less than 35. Autofocus and optical anti-hand shaking may be performed by using the second lens L2-1 and the third lens L3-1. During focusing and anti-hand shaking, a high resolution may be maintained without deterioration of optical performance.

Figure 3:
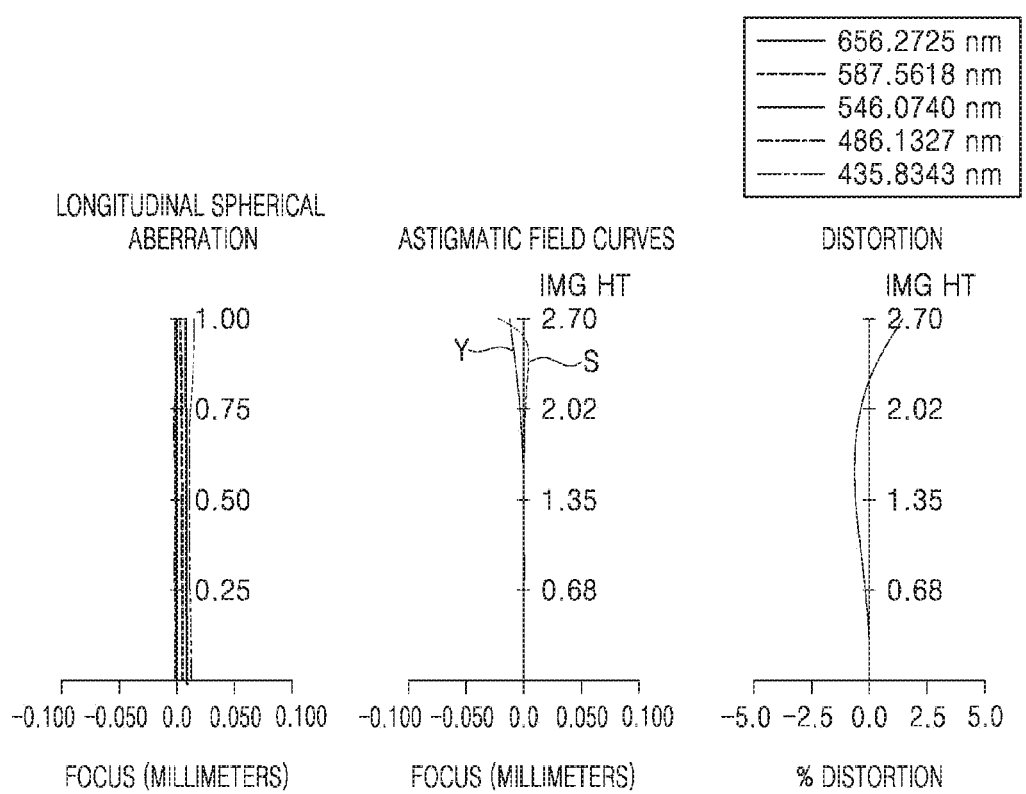
FIG. 3 is an aberration diagram of the optical lens assembly according to the first numerical embodiment from among various embodiments.

FIG. 3 illustrates longitudinal spherical aberration, astigmatic field curves, and distortion of the optical lens assembly 100-1 according to the first numerical embodiment from among various embodiments. The longitudinal spherical aberration occurred with respect to light having wavelengths of, for example, 656.2725 nanometers (nm), 587.5618 nm, 546.07400 nm, 486.1327 nm, and 435.8343 nm. The astigmatic field curves show tangential field curvature T and sagittal field curvature S. The astigmatic field curves occurred with respect to light having a wavelength of about 587.5618 nm, and the distortion occurred with respect to light having a wavelength of about 587.5618 nm.

Second Numerical Embodiment

FIG. 4 illustrates the optical lens assembly 100-2 according to the second numerical embodiment from among various embodiments. Table 3 shows, for example, design data according to the second numerical embodiment.

TABLE 3

| Lens surface | Aspherical surface type | R (mm) | Dn (mm) | Nd | Vd | Reflection and refraction properties |
|---|---|---|---|---|---|---|
| S1 | aspherical surface | 6.43599 | 3.50 | 1.5348 | 55.7 | refraction |
| S2 | spherical surface | infinity | −3.10 | 1.5348 | 55.7 | reflection |
| S3 | aspherical surface | 9.20750 | −0.40 | | | refraction |
| S4 | aspherical surface | 11.76618 | −0.40 | 1.614200 | 25.6 | refraction |
| S5 | aspherical surface | −5.05667 | −1.44 | | | refraction |
| S6 | aspherical surface | −6.91395 | −1.05 | 1.5441 | 56.1 | refraction |
| S7 | aspherical surface | 11.81285 | −0.15 | | | refraction |
| S8 | aspherical surface | 17.56400 | −0.33 | 1.614200 | 26 | refraction |
| S9 | aspherical surface | −54.21813 | −0.53 | | | refraction |
| S10 | aspherical surface | −8.58581 | −0.68 | 1.614425 | 26 | refraction |
| S11 | aspherical surface | 13.75912 | −0.15 | | | refraction |
| S12 | aspherical surface | 10.51545 | −0.33 | 1.5441 | 56.1 | refraction |
| S13 | aspherical surface | −3.96855 | −4.61 | | | refraction |
| S14 | aspherical surface | 65.24697 | −0.94 | 1.614425 | 26 | refraction |
| S15 | aspherical surface | −5.85368 | −0.37 | | | refraction |
| S16 | aspherical surface | −13.10679 | −1.29 | 1.614200 | 26 | refraction |
| S17 | aspherical surface | 6.93340 | −1.50 | | | refraction |
| S18 | spherical surface | Infinity | −0.11 | 1.516800 | 64 | refraction |
| S19 | spherical surface | Infinity | −0.39 | | | refraction |

Table 4 shows aspherical surface coefficients according to the second numerical embodiment.

TABLE 4

| Lens surface | K | A | B | C | D |
|---|---|---|---|---|---|
| S1 | −0.217059 | −3.6630E−05 | −3.6958E−06 | 3.1262E−07 | −1.4461E−08 |
| S3 | −3.074487 | −6.6326E−04 | −2.3569E−05 | 3.0766E−06 | 9.7452E−08 |
| S4 | −0.328945 | 3.4387E−04 | −1.1907E−05 | −1.9036E−05 | 1.8158E−06 |
| S5 | 0.021904 | 2.9483E−04 | 2.5050E−04 | −4.9020E−05 | 2.3046E−06 |
| S6 | −0.2808 | 4.0609E−04 | −7.0261E−05 | 2.7741E−06 | 1.7864E−06 |
| S7 | −7.458106 | −1.7822E−04 | −1.3258E−04 | 2.7809E−05 | −4.6250E−07 |
| S8 | −18.558253 | −9.0655E−04 | 1.3928E−04 | 3.1137E−05 | −6.7074E−06 |
| S9 | −2 | −3.7285E−04 | 1.1201E−04 | 4.4700E−05 | −9.2408E−06 |
| S10 | 6.88445 | 9.1725E−04 | 4.8582E−04 | 2.3150E−06 | −8.7834E−06 |
| S11 | −10 | 1.0026E−03 | −6.6139E−05 | −7.4988E−05 | 1.8726E−05 |
| S12 | −0.857565 | −1.7991E−03 | −1.6716E−04 | −4.5819E−05 | 2.8110E−05 |
| S13 | 0.159639 | −9.5253E−05 | 6.5811E−04 | 2.7488E−07 | −9.1287E−06 |
| S14 | −6.067663 | 6.3028E−03 | 9.1403E−04 | −4.7456E−05 | −1.2710E−05 |
| S15 | −6.819917 | −3.1771E−03 | 1.1486E−03 | −7.1923E−05 | −2.9767E−07 |
| S16 | 12.268191 | 8.2076E−04 | −6.8489E−04 | 1.3556E−04 | −8.8711E−06 |
| S17 | 2.187432 | 6.3839E−03 | −8.8648E−04 | 5.2407E−05 | −4.8338E−06 |

In the optical lens assembly 100-2 of the second numerical embodiment from among various embodiments, an Abbe number of the bending portion BR-2 is about 55.7, the ratio (Id/f) is about 0.108, and the telephoto ratio (TTL/f) is about 0.92, and thus miniaturization may be achieved.

The ratio (ttla/ttlb) is about 0.197, and while forming a high-magnification telephoto lens, the thickness of a camera module may be set to be relatively small. The first lens L1-2 has an Abbe number of about 25.6, and thus chromatic aberration of a telephoto lens may be effectively reduced.

Figure 5:
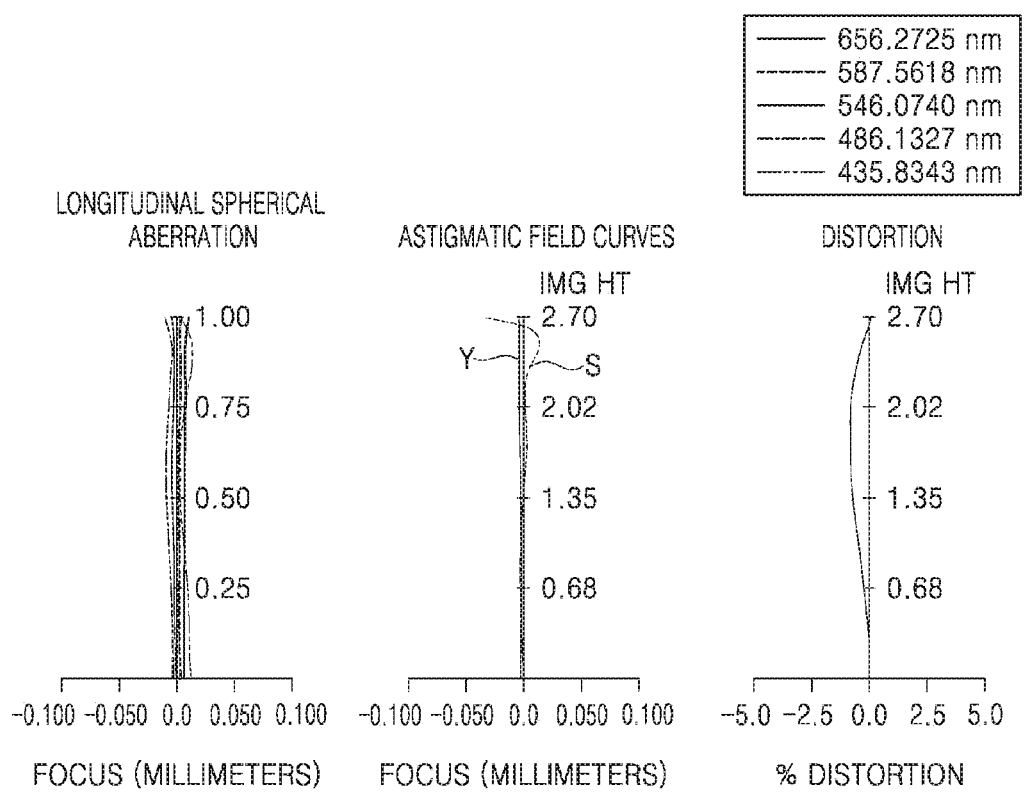
FIG. 5 is an aberration diagram of the optical lens assembly according to the second numerical embodiment from among various embodiments.

FIG. 5 illustrates longitudinal spherical aberration, astigmatic field curves, and distortion of the optical lens assembly 100-2 according to the second numerical embodiment of the disclosure.

Third Numerical Embodiment

FIG. 6 illustrates the optical lens assembly 100-3 according to the third numerical embodiment from among various embodiments. Table 5 shows, for example, design data according to the third numerical embodiment.

TABLE 5

| Lens surface | Aspherical surface type | R (mm) | Dn (mm) | Nd | Vd | Reflection and refraction properties |
|---|---|---|---|---|---|---|
| S1 | aspherical surface | 5.62859 | 3.05 | 1.5348 | 55.7 | refraction |
| S2 | spherical surface | Infinity | −2.81 | 1.5348 | 55.7 | reflection |
| S3 | aspherical surface | 9.33158 | −0.40 | | | refraction |
| S4 | aspherical surface | 14.26342 | −0.40 | 1.6142 | 25.6 | refraction |
| S5 | aspherical surface | −4.51848 | −0.72 | | | refraction |
| S6 | aspherical surface | −4.83430 | −1.05 | 1.5441 | 56.1 | refraction |
| S7 | aspherical surface | 28.04704 | −0.10 | | | refraction |
| S8 | aspherical surface | −13.62890 | −0.33 | 1.6142 | 26 | refraction |
| S9 | aspherical surface | −6.28686 | −0.65 | | | refraction |
| S10 | aspherical surface | −10.47270 | −0.64 | 1.614425 | 26 | refraction |
| S11 | aspherical surface | 7.02602 | −0.15 | | | refraction |
| S12 | aspherical surface | 5.62104 | −0.33 | 1.5441 | 56.1 | refraction |
| S13 | aspherical surface | −3.88103 | −2.20 | | | refraction |
| S14 | aspherical surface | 10.21315 | −0.38 | 1.614425 | 26 | refraction |
| S15 | aspherical surface | −24.12487 | −1.40 | | | refraction |
| S16 | aspherical surface | 96.67614 | −1.14 | 1.614200 | 26 | refraction |
| S17 | aspherical surface | 5.87286 | −1.50 | | | refraction |
| S18 | spherical surface | Infinity | −0.11 | 1.516800 | 64 | refraction |
| S19 | spherical surface | Infinity | −0.41 | | | refraction |

Table 6 shows aspherical surface coefficients according to the third numerical embodiment.

TABLE 6

| Lens surface | K | A | B | C | D |
|---|---|---|---|---|---|
| S1 | −0.25678 | −7.8376E−05 | −4.8352E−06 | 2.4555E−07 | −1.7617E−08 |
| S3 | −3.008855 | −6.6931E−04 | −2.4673E−05 | 3.5234E−06 | 2.6192E−08 |
| S4 | 2 | 3.9837E−04 | −1.0378E−05 | −2.0670E−05 | 2.1010E−06 |
| S5 | 0.039988 | 2.7295E−04 | 2.3716E−04 | −4.4371E−05 | 2.4184E−06 |
| S6 | −0.139824 | 2.1860E−04 | −6.9493E−05 | 3.2198E−06 | 1.4371E−06 |
| S7 | 2.923673 | −1.0759E−04 | −1.0493E−04 | 3.6803E−05 | 1.2254E−07 |
| S8 | −19.667082 | −7.3833E−04 | 1.9141E−04 | 4.1581E−05 | −2.2733E−06 |
| S9 | −0.614518 | −5.1144E−04 | 1.0013E−04 | 5.4429E−05 | −8.0573E−06 |
| S10 | 6.662548 | 9.5051E−04 | 3.6037E−04 | −2.1540E−05 | 6.4403E−06 |

TABLE 6-continued

| Lens surface | K | A | B | C | D |
|---|---|---|---|---|---|
| S11 | −7.13254 | 3.5627E−04 | −8.7446E−06 | −4.3204E−05 | 3.3979E−05 |
| S12 | −5 | −3.1089E−03 | −3.4057E−04 | −6.6637E−05 | 4.2844E−05 |
| S13 | 0.181216 | 3.1014E−04 | −8.3219E−04 | −2.3536E−04 | −3.5278E−05 |
| S14 | −15 | 4.2847E−03 | 1.0403E−03 | −1.5567E−04 | −6.8326E−05 |
| S15 | −10 | −5.7281E−03 | 1.1061E−03 | −7.7153E−05 | −2.0473E−05 |
| S16 | 15 | 3.6088E−03 | −6.9832E−04 | 9.4060E−05 | −2.5347E−06 |
| S17 | 2.867819 | 9.5886E−03 | −1.4396E−03 | 1.1380E−04 | −4.7745E−06 |

In the optical lens assembly 100-3 of the third numerical embodiment from among various embodiments, an Abbe number of the bending portion BR-3 is about 55.7, the ratio (Id/f) is about 0.122, and the telephoto ratio (TTL/f) is about 0.87, and thus miniaturization may be achieved.

The ratio (ttla/ttlb) is about 0.207, and while forming a high-magnification telephoto lens, the thickness of a camera module may be set to be relatively small. The first lens L1-3 has an Abbe number of about 25.6 and chromatic aberration of a telephoto lens may be effectively reduced.

Figure 7:
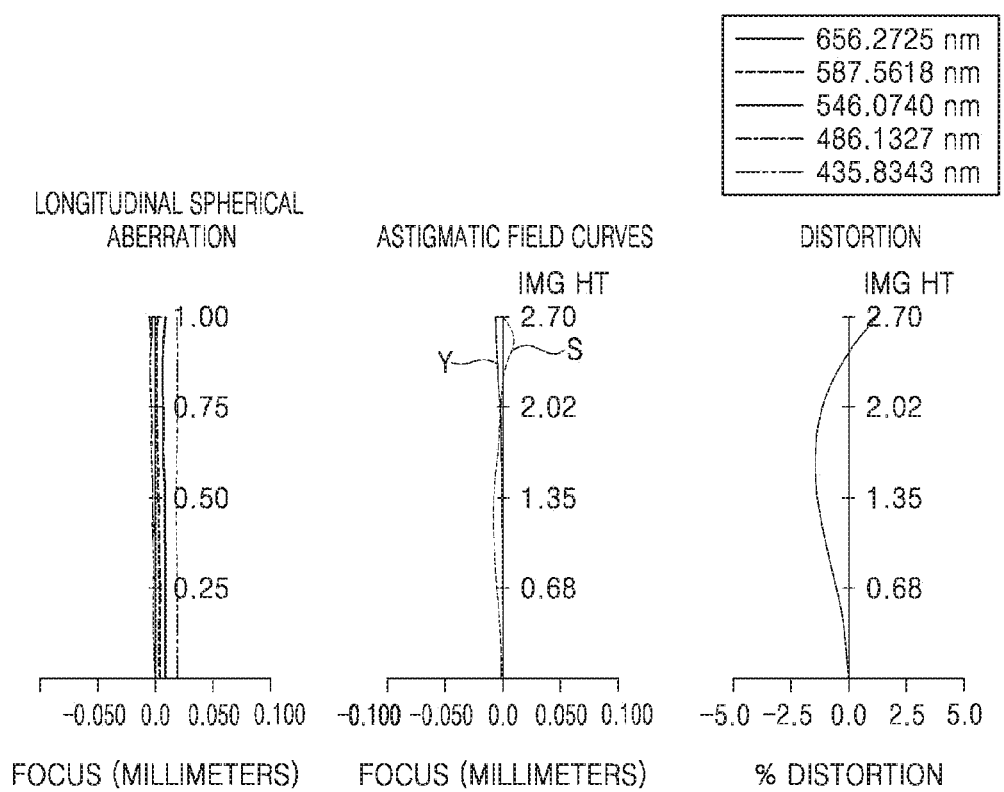
FIG. 7 is an aberration diagram of the optical lens assembly according to the third numerical embodiment from among various embodiments.

FIG. 7 illustrates longitudinal spherical aberration, astigmatic field curves, and distortion of the optical lens assembly 100-3 according to the third numerical embodiment of the disclosure.

Fourth Numerical Embodiment

FIG. 8 illustrates the optical lens assembly 100-4 according to the fourth numerical embodiment from among various embodiments. Table 7 shows, for example, design data according to the fourth numerical embodiment.

TABLE 7

| Lens surface | Aspherical surface type | R (mm) | Dn (mm) | Nd | Vd | Reflection and refraction properties |
|---|---|---|---|---|---|---|
| S1 | aspherical surface | 4.18733 | 2.63 | 1.5348 | 55.7 | refraction |
| S2 | spherical surface | Infinity | −2.22 | 1.5348 | 55.7 | reflection |
| S3 | aspherical surface | 15.56706 | −0.40 | | | refraction |
| S4 | aspherical surface | 13.16373 | −0.40 | 1.6142 | 25.6 | refraction |
| S5 | aspherical surface | −3.46765 | −0.44 | | | refraction |
| S6 | aspherical surface | −3.40638 | −1.05 | 1.5441 | 56.1 | refraction |
| S7 | aspherical surface | 98.82172 | −0.10 | | | refraction |
| S8 | aspherical surface | −10.89196 | −0.33 | 1.6142 | 26 | refraction |
| S9 | aspherical surface | −5.55441 | −0.63 | | | refraction |
| S10 | aspherical surface | 21.45465 | −0.65 | 1.614425 | 26 | refraction |
| S11 | aspherical surface | 3.83509 | −0.15 | | | refraction |
| S12 | aspherical surface | 4.44036 | −0.33 | 1.5441 | 56.1 | refraction |
| S13 | aspherical surface | −4.77865 | −0.95 | | | refraction |
| S14 | aspherical surface | 6.44988 | −0.39 | 1.614425 | 26 | refraction |
| S15 | aspherical surface | 6.64639 | −0.53 | | | refraction |
| S16 | aspherical surface | 8.08008 | −0.92 | 1.614200 | 26 | refraction |
| S17 | aspherical surface | 5.72194 | −1.00 | | | refraction |
| S18 | spherical surface | Infinity | −0.11 | 1.516800 | 64 | refraction |
| S19 | spherical surface | Infinity | −0.41 | | | refraction |

Table 8 shows aspherical surface coefficients according to the fourth numerical embodiment.

TABLE 8

| Lens surface | K | A | B | C | D |
|---|---|---|---|---|---|
| S2 | −0.232328 | 7.2825E−06 | −2.8698E−06 | 1.3975E−06 | −1.0587E−07 |
| S4 | −5 | −9.1592E−05 | 7.1069E−05 | 2.0068E−05 | 9.1447E−06 |
| S5 | 1.801537 | 9.4047E−04 | 1.7315E−04 | 6.9571E−05 | 1.8572E−05 |
| S6 | 0.213962 | −4.9971E−04 | 2.2797E−04 | 9.5451E−06 | 3.0063E−05 |
| S8 | 0.159715 | −7.7675E−04 | −1.2037E−04 | −5.1862E−05 | 9.3094E−06 |
| S9 | −10 | −2.6756E−04 | −1.2150E−04 | 1.6629E−05 | 1.1569E−05 |
| S10 | −20 | 8.0843E−05 | 7.2454E−04 | 1.4743E−04 | 1.6781E−05 |
| S11 | 0.796903 | −1.5219E−03 | 8.7256E−05 | 3.4371E−05 | −1.6312E−05 |
| S13 | 10 | 1.7028E−03 | 1.7047E−03 | 3.4201E−04 | 8.0717E−06 |
| S14 | −1.758475 | 3.4003E−03 | 9.6446E−04 | 2.0842E−04 | 9.4866E−06 |
| S15 | −2.048358 | −1.9791E−03 | −6.5426E−04 | −1.5781E−04 | 1.1382E−04 |
| S16 | 0.987705 | −1.7041E−03 | 3.4852E−04 | −5.8508E−05 | 4.7587E−05 |
| S17 | 3.350817 | 1.4439E−02 | 4.2007E−03 | −7.2256E−05 | 2.7186E−04 |
| S18 | 7.888408 | −1.8456E−03 | 1.6645E−03 | 1.8546E−04 | 1.3283E−05 |
| S19 | −3.334005 | −1.6438E−03 | −5.7242E−04 | 1.0337E−04 | −1.4348E−06 |
| S20 | 3.482148 | 1.4044E−02 | −1.8971E−03 | 1.3652E−04 | −2.0471E−05 |

In the optical lens assembly 100-4 of the fourth numerical embodiment according to various embodiments, an Abbe number of the bending portion BR-2 is about 55.7, the ratio (Id/f) is about 0.18, and the telephoto ratio (TTL/f) is about 0.94, and thus miniaturization may be achieved.

The ratio (ttla/ttlb) is about 0.24, and while forming a high-magnification telephoto lens, the thickness of a camera module may be set to be relatively small. The first lens L1-4 may have an Abbe number of about 25.6, and the chromatic aberration of a telephoto lens may be effectively reduced.

Figure 9:
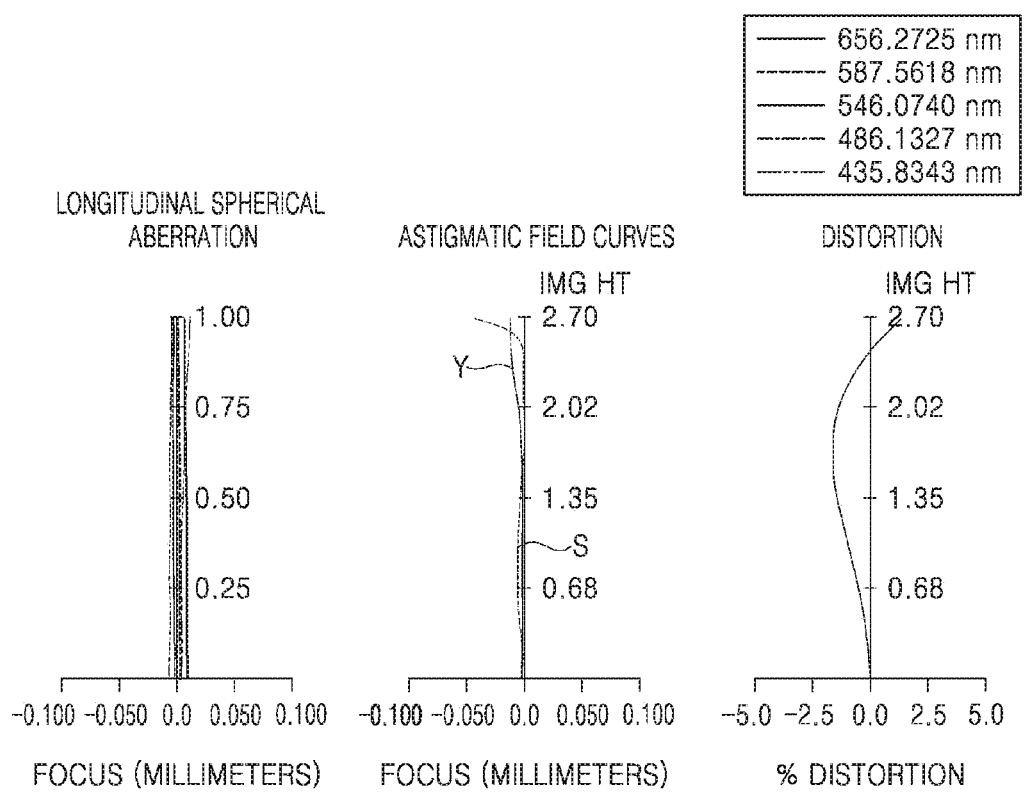
FIG. 9 is an aberration diagram of the optical lens assembly according to the fourth numerical embodiment from among various embodiments.

FIG. 9 illustrates longitudinal spherical aberration, astigmatic field curves, and distortion of the optical lens assembly 100-4 according to the fourth numerical embodiment of the disclosure.

Fifth Numerical Embodiment

FIG. 10 illustrates the optical lens assembly 100-5 according to the fifth numerical embodiment from among various embodiments. Table 9 shows, for example, design data according to the fifth numerical embodiment.

TABLE 9

| Lens surface | Aspherical surface type | R (mm) | Dn (mm) | Nd | Vd |
|---|---|---|---|---|---|
| S1 | aspherical surface | 5.59896 | 1.500 | 1.5348 | 55.7 |
| S2 | aspherical surface | 31.43826 | 0.200 | | |
| S3 | aspherical surface | 12.33246 | 0.905 | 1.5348 | 55.7 |
| S4 | aspherical surface | −49.03059 | 0.255 | | |
| S5 | aspherical surface | −79.19932 | 0.400 | 1.605394 | 28 |

TABLE 9-continued

| Lens surface | Aspherical surface type | R (mm) | Dn (mm) | Nd | Vd |
|---|---|---|---|---|---|
| S6 | aspherical surface | 12.80874 | 0.351 | | |
| S7 | aspherical surface | 15.75910 | 0.600 | 1.650380 | 22 |
| S8 | aspherical surface | 21.96386 | 0.294 | | |
| S9 | aspherical surface | 66.96798 | 0.450 | 1.591094 | 31 |
| S10 | aspherical surface | 13.91766 | 0.275 | | |
| S11 | aspherical surface | 18.11656 | 0.400 | 1.586994 | 33 |
| S12 | aspherical surface | 4.43677 | 0.383 | | |
| S13 | aspherical surface | 3.78744 | 1.027 | 1.5348 | 55.7 |
| S14 | aspherical surface | 16.18830 | 0.405 | | |
| S15 | aspherical surface | 46.25496 | 0.400 | 1.581565 | 34 |
| S16 | aspherical surface | 10.47855 | 2.208 | | |
| S17 | aspherical surface | −15.04802 | 0.500 | 1.5441 | 56.1 |
| S18 | aspherical surface | 9.40455 | 2.265 | | |
| S19 | aspherical surface | 77.84431 | 0.868 | 1.650380 | 22 |
| S20 | aspherical surface | −13.31457 | 4.100 | | |
| S21 | spherical surface | Infinity | 0.110 | 1.5168 | 64.2 |
| S22 | spherical surface | Infinity | 0.400 | | |

Table 10 shows aspherical surface coefficients according to the fifth numerical embodiment.

TABLE 10

| Lens surface | K | A | B | C | D |
|---|---|---|---|---|---|
| S1 | −0.140438 | −5.3398E−05 | −2.8245E−06 | 7.4115E−08 | −1.2117E−09 |
| S2 | 0.967334 | 4.0655E−05 | 1.6104E−06 | −1.4926E−08 | 8.4682E−09 |
| S3 | −0.354549 | −6.3171E−05 | −3.3197E−06 | 3.2581E−08 | 1.8602E−09 |
| S4 | −0.62062 | 4.9612E−06 | −8.1524E−07 | −1.2664E−07 | −1.2452E−08 |
| S5 | −1 | 2.7678E−05 | 3.6794E−07 | −1.4822E−07 | −1.9330E−08 |
| S6 | −1 | −8.4747E−05 | −3.5074E−06 | 6.4683E−08 | 6.2310E−08 |
| S7 | 1 | 1.8391E−04 | 1.1398E−05 | 2.4418E−07 | −2.6398E−08 |
| S8 | −1 | −9.7608E−05 | −1.3348E−05 | −8.2953E−07 | −8.3749E−08 |
| S9 | −1 | −1.6383E−04 | −1.2789E−05 | −6.7266E−07 | 2.0837E−07 |
| S10 | 1 | 2.3757E−04 | 8.7349E−06 | −4.4257E−07 | −6.6631E−07 |
| S11 | −1 | −4.8451E−04 | −4.5945E−05 | −5.8895E−06 | −3.6879E−07 |
| S12 | 0.117151 | 1.4622E−04 | −4.9840E−05 | 2.6938E−07 | 2.3812E−07 |
| S13 | 0.389771 | 1.1832E−03 | 2.0980E−04 | 1.1224E−05 | 4.0772E−06 |
| S14 | 1 | 2.0368E−05 | −4.3128E−05 | −1.5825E−05 | −1.3670E−05 |
| S15 | −1 | −1.4885E−03 | −3.0143E−04 | −7.7757E−05 | −1.1494E−05 |
| S16 | 1 | 3.7248E−03 | 3.2019E−04 | −1.8713E−06 | 1.0750E−05 |
| S17 | −1 | 2.6151E−03 | 1.2277E−04 | 1.0015E−04 | −7.7799E−05 |
| S18 | 1 | 2.6225E−03 | 5.5522E−04 | 7.3457E−05 | −6.9988E−05 |
| S19 | −1 | −5.2442E−03 | 4.6521E−04 | 6.9692E−05 | −6.5974E−06 |
| S20 | −1 | −5.5986E−03 | 3.3007E−04 | 3.2296E−05 | −1.4471E−06 |

In the optical lens assembly 100-5 of the fifth numerical embodiment from among various embodiments, a reflection mirror is provided as the bending portion BR-5, and the telephoto ratio is about 0.83, and thus miniaturization and high resolution may be implemented. As the first lens L1-5 has positive refractive power, the second lens L2-5 has positive refractive power, and each of the first lens L1-5 and the second lens L2-5 has an Abbe number greater than or equal to 50, for example, 55.7, an increase of spherical aberration due to a strong refractive power may be reduced. As the third lens L3-5 has negative refractive power and an Abbe number of less than or equal to 35, for example, 28, chromatic aberration may be corrected. Autofocus and optical anti-hand shaking may be performed by using the seventh lens L7-5 and the eighth lens L8-5.

When the optical lens assembly is applied to mobile devices to configure a telephoto lens having a lower telephoto ratio by using a plastic lens having a low refractive index, spherical aberration may increase at a lens surface having a relatively large refractive power, and thus manufacturing sensitivity may increase. The above problem may be solved by distributing refractive power by using six or more lenses.

Figure 11:
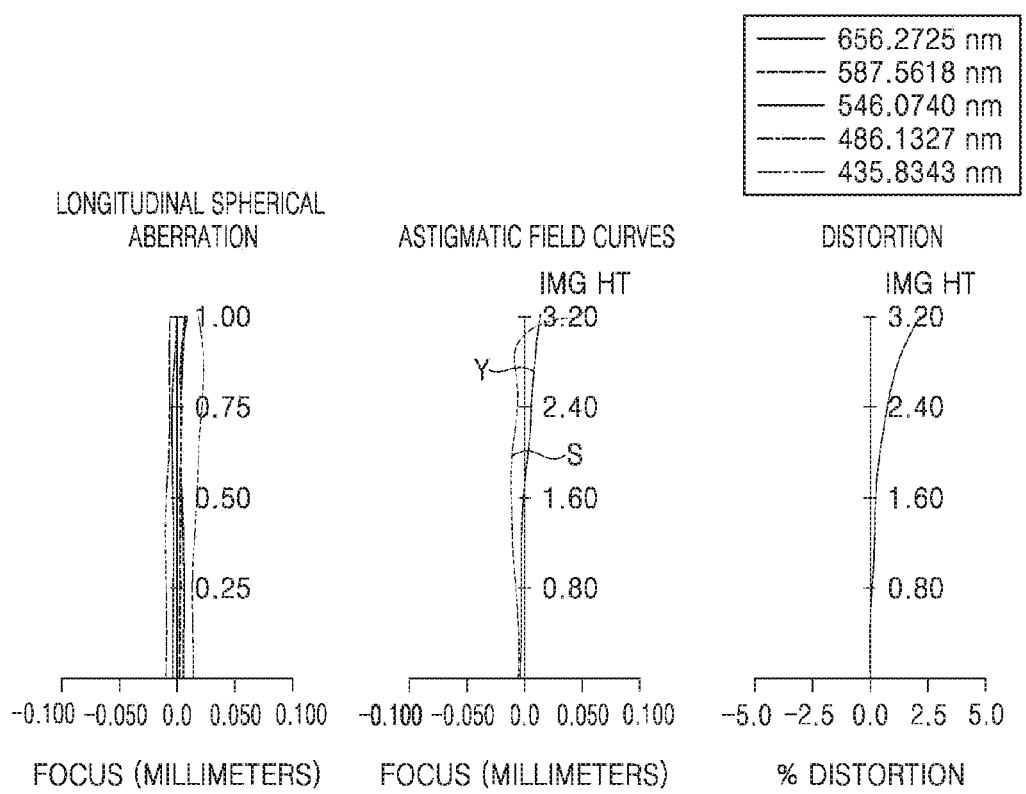
FIG. 11 is an aberration diagram of the optical lens assembly according to the fifth numerical embodiment from among various embodiments.

FIG. 11 illustrates longitudinal spherical aberration, astigmatic field curves, and distortion of the optical lens assembly 100-5 according to the fifth numerical embodiment of the disclosure.

Sixth Numerical Embodiment

FIG. 12 illustrates the optical lens assembly 100-6 according to the sixth numerical embodiment from among various embodiments. Table 11 shows, for example, design data according to the sixth numerical embodiment.

TABLE 11

| Lens surface | Aspherical surface type | R (mm) | Dn (mm) | Nd | Vd |
|---|---|---|---|---|---|
| S1 | aspherical surface | 5.49851 | 1.483 | 1.5348 | 55.7 |
| S2 | aspherical surface | 25.85103 | 0.200 | | |
| S3 | aspherical surface | 9.91350 | 1.022 | 1.5348 | 55.7 |
| S4 | aspherical surface | −43.02622 | 0.252 | | |
| S5 | aspherical surface | −65.51767 | 0.400 | 1.604126 | 28 |
| S6 | aspherical surface | 10.21247 | 0.364 | | |
| S7 | aspherical surface | 12.72517 | 0.689 | 1.650380 | 22 |
| S8 | aspherical surface | 30.03614 | 0.283 | | |
| S9 | aspherical surface | 205.53638 | 0.405 | 1.597400 | 30 |
| S10 | aspherical surface | 12.33428 | 0.288 | | |
| S11 | aspherical surface | 17.01529 | 0.400 | 1.595511 | 30 |
| S12 | aspherical surface | 4.34078 | 0.400 | | |
| S13 | aspherical surface | 3.65713 | 1.025 | 1.5348 | 55.7 |
| S14 | aspherical surface | 14.78720 | 0.402 | | |
| S15 | aspherical surface | 59.48557 | 0.400 | 1.589673 | 32 |
| S16 | aspherical surface | 7.74161 | 3.700 | | |
| S17 | aspherical surface | −4.22852 | 0.400 | 1.5441 | 56.1 |
| S18 | aspherical surface | 80.77905 | 1.772 | | |
| S19 | aspherical surface | 9.93795 | 1.401 | 1.650380 | 22 |
| S20 | aspherical surface | −16.63131 | 1.400 | | |
| S21 | spherical surface | Infinity | 0.110 | 1.5168 | 64.2 |
| S22 | spherical surface | Infinity | 0.400 | | |

Table 12 shows aspherical surface coefficients according to the sixth numerical embodiment.

TABLE 12

| Lens surface | K | A | B | C | D |
|---|---|---|---|---|---|
| S1 | −0.144345 | −5.7367E−05 | −3.0120E−06 | 3.5851E−08 | −4.3236E−09 |
| S2 | 1 | 5.0569E−05 | 2.2151E−06 | 2.7148E−08 | 1.1914E−08 |
| S3 | −0.429519 | −7.1341E−05 | −3.2949E−06 | 6.2075E−08 | 6.8570E−09 |
| S4 | −1.372837 | 1.2760E−05 | −8.8729E−07 | −1.6016E−07 | −8.0876E−09 |
| S5 | 1.878695 | 2.5966E−05 | 8.3768E−07 | −6.0648E−08 | −1.7604E−08 |
| S6 | −0.962142 | −8.4395E−05 | −5.1579E−06 | −1.9737E−07 | 2.4475E−08 |
| S7 | 0.993781 | 1.9440E−04 | 1.3170E−05 | 3.8848E−07 | −1.8762E−08 |
| S8 | −0.927218 | −1.1313E−04 | −1.4988E−05 | −6.7674E−07 | 3.4681E−08 |
| S9 | 1.84179 | −1.6171E−04 | −8.9479E−06 | 2.5891E−08 | 2.2104E−07 |
| S10 | 1 | 2.5366E−04 | 7.6392E−06 | −9.6552E−07 | −8.0659E−07 |
| S11 | −1 | −5.0139E−04 | −4.8024E−05 | −5.9957E−06 | −4.5267E−07 |
| S12 | 0.139846 | 1.7290E−04 | −2.9764E−05 | 5.8472E−06 | 1.1252E−06 |
| S13 | 0.3852 | 1.1505E−03 | 2.1358E−04 | 1.0196E−05 | 4.1219E−06 |
| S14 | 0.706629 | 2.0068E−05 | −3.7812E−05 | −2.4639E−05 | −1.6111E−05 |
| S15 | −10 | −1.6008E−03 | −3.5388E−04 | −6.8098E−05 | −1.2231E−05 |
| S16 | 1 | 3.7834E−03 | 4.1548E−04 | −3.4326E−05 | 2.6467E−05 |
| S17 | −0.574096 | 2.6144E−03 | −1.4916E−04 | 5.6093E−05 | −2.4597E−05 |
| S18 | −10 | 1.8359E−03 | 3.0244E−04 | −8.3205E−06 | −1.1236E−05 |
| S19 | 1.787999 | −5.1498E−03 | 5.9412E−06 | 3.8163E−05 | −1.5760E−06 |
| S20 | 0.034682 | −8.1777E−03 | 3.1740E−04 | 5.2091E−06 | 2.3642E−07 |

In the optical lens assembly 100-6 of the sixth numerical embodiment from among various embodiments, a reflection mirror is provided as the bending portion BR-6, and the telephoto ratio is about 0.78, and thus miniaturization and high resolution may be implemented. The first lens L1-6 may have positive refractive power and an Abbe number of about 55.7. The second lens L2-6 may have positive refractive power and an Abbe number of about 55.7. As the third lens L3-6 has negative refractive power and an Abbe number of about 28, chromatic aberration may be corrected.

Figure 13:
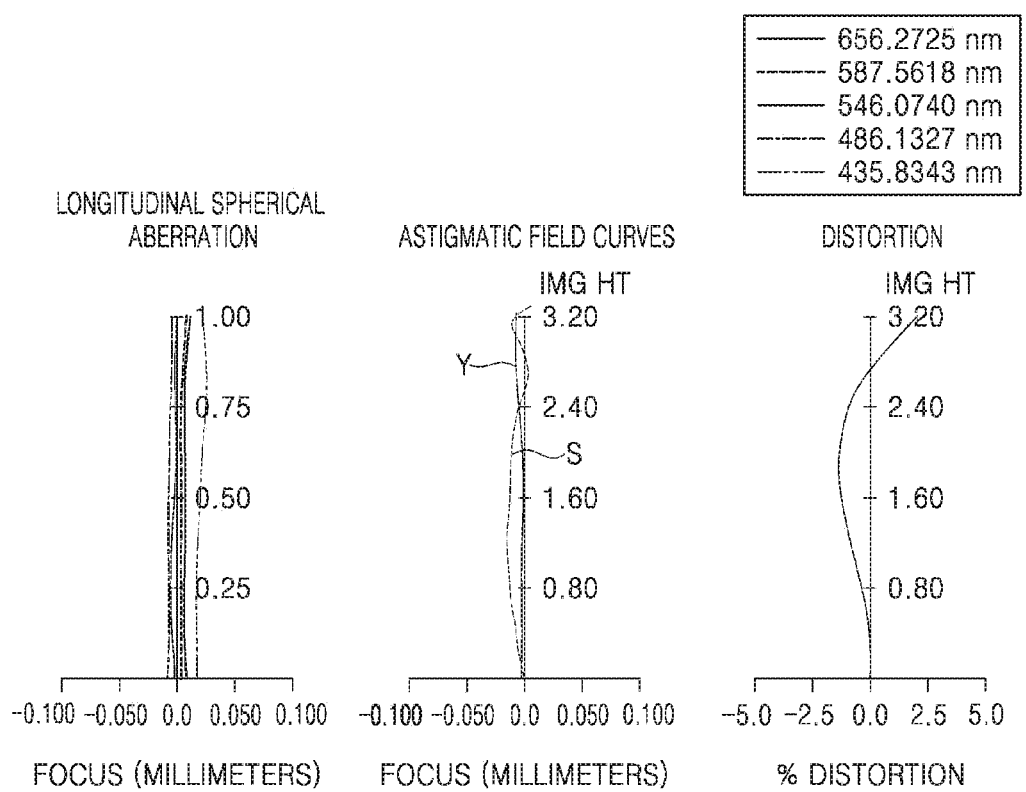
FIG. 13 is an aberration diagram of the optical lens assembly according to the sixth numerical embodiment from among various embodiments.

FIG. 13 illustrates longitudinal spherical aberration, astigmatic field curves, and distortion of the optical lens assembly 100-6 according to the sixth numerical embodiment of the disclosure.

Seventh Numerical Embodiment

FIG. 14 illustrates the optical lens assembly 100-7 according to the seventh numerical embodiment from among various embodiments. Table 13 shows, for example, design data according to the seventh numerical embodiment.

TABLE 13

| Lens surface | Aspherical surface type | R (mm) | Dn (mm) | Nd | Vd |
|---|---|---|---|---|---|
| S1 | aspherical surface | 5.46503 | 1.500 | 1.5348 | 55.7 |
| S2 | aspherical surface | 26.41970 | 0.200 | | |
| S3 | aspherical surface | 6.91812 | 1.235 | 1.5348 | 55.7 |
| S4 | aspherical surface | −44.33918 | 0.245 | | |
| S5 | aspherical surface | −77.77371 | 0.400 | 1.673288 | 30 |
| S6 | aspherical surface | 6.63763 | 0.416 | | |
| S7 | aspherical surface | 8.85506 | 0.792 | 1.555072 | 70 |
| S8 | aspherical surface | 32.60765 | 0.275 | | |
| S9 | aspherical surface | 115.10139 | 0.400 | 1.628275 | 38 |
| S10 | aspherical surface | 10.73184 | 0.256 | | |
| S11 | aspherical surface | 11.57188 | 0.400 | 1.740001 | 45 |
| S12 | aspherical surface | 4.47794 | 0.513 | | |
| S13 | aspherical surface | 3.61841 | 1.135 | 1.5348 | 55.7 |
| S14 | aspherical surface | −195.38166 | 0.400 | | |
| S15 | aspherical surface | −16.00408 | 0.400 | 1.804781 | 43 |
| S16 | aspherical surface | 7.48475 | 3.783 | | |
| S17 | aspherical surface | −2.89719 | 0.400 | 1.5441 | 56.1 |
| S18 | aspherical surface | −12.70319 | 0.827 | | |
| S19 | aspherical surface | 11.65966 | 1.411 | 1.846663 | 24 |
| S20 | aspherical surface | −11.34606 | 1.000 | | |
| S21 | spherical surface | Infinity | 0.110 | 1.5168 | 64.2 |
| S22 | spherical surface | Infinity | 0.400 | | |

Table 14 shows aspherical surface coefficients according to the seventh numerical embodiment.

TABLE 14

| Lens surface | K | A | B | C | D |
|---|---|---|---|---|---|
| S1 | −0.135588 | −3.5075E−05 | −3.1964E−06 | −3.2171E−08 | −7.8129E−09 |
| S2 | 1 | 5.4199E−05 | 2.6258E−06 | 5.3927E−08 | 1.1323E−08 |
| S3 | −0.428754 | −6.8908E−05 | −2.9139E−06 | 3.8944E−08 | 6.7858E−09 |
| S4 | −3.766372 | 1.6160E−05 | −1.3412E−06 | −1.8252E−07 | −3.9095E−09 |
| S5 | 9.98223 | 3.3026E−05 | 2.7856E−06 | 7.7578E−08 | −1.5354E−08 |
| S6 | −0.964325 | −7.8831E−05 | −1.1402E−05 | −7.2424E−07 | −2.1046E−08 |
| S7 | 0.57437 | 1.4337E−04 | 1.7177E−05 | 8.7534E−07 | 4.8366E−08 |
| S8 | 0.666944 | −6.0621E−05 | −1.8674E−05 | −1.1538E−06 | 6.2239E−08 |
| S9 | −1 | −2.0158E−04 | −4.8077E−06 | 3.5076E−07 | 3.9082E−08 |
| S10 | 1 | 3.6546E−04 | 8.2981E−06 | −1.0596E−06 | −6.7867E−07 |
| S11 | −1 | −6.0451E−04 | −5.3280E−05 | −5.7062E−06 | −5.1526E−07 |
| S12 | 0.258729 | 4.1381E−04 | 2.1026E−05 | 1.3982E−05 | 1.8849E−06 |
| S13 | 0.437304 | 1.4147E−03 | 2.6157E−04 | 1.8827E−05 | 6.8227E−06 |
| S14 | −1 | −1.1906E−04 | 1.7659E−05 | −1.5897E−05 | −8.9455E−06 |
| S15 | −8.768314 | −1.6313E−03 | −3.7427E−04 | −2.2092E−05 | 5.0893E−06 |
| S16 | 0.030141 | 3.5000E−03 | 3.8079E−04 | −6.6759E−05 | 5.5977E−05 |
| S17 | −0.318012 | 2.4608E−03 | −1.8508E−04 | 4.1520E−05 | 9.1261E−06 |
| S18 | 1 | −1.1231E−03 | 1.5674E−04 | 3.5164E−05 | −3.3179E−06 |
| S19 | 8.991946 | −4.6587E−03 | 7.7953E−06 | 2.8575E−05 | −1.3427E−06 |
| S20 | −10 | −7.0909E−03 | 3.8742E−04 | −4.8396E−06 | 5.1677E−07 |

In the optical lens assembly 100-7 of the seventh numerical embodiment from among various embodiments, a reflection mirror is provided as the bending portion BR-7, and the telephoto ratio is about 0.75, and thus miniaturization and high resolution may be implemented. The first lens L1-7 may have positive refractive power and an Abbe number of about 55.7. The second lens L2-7 may have positive refractive power and an Abbe number of about 55.7. As the third lens L3-7 may be configured to have negative refractive power and an Abbe number of about 28, chromatic aberration may be corrected. As the fourth lens L4-7 may be configured to have an Abbe number greater than or equal to about 70, for example, 70, chromatic aberration may be corrected.

Figure 15:
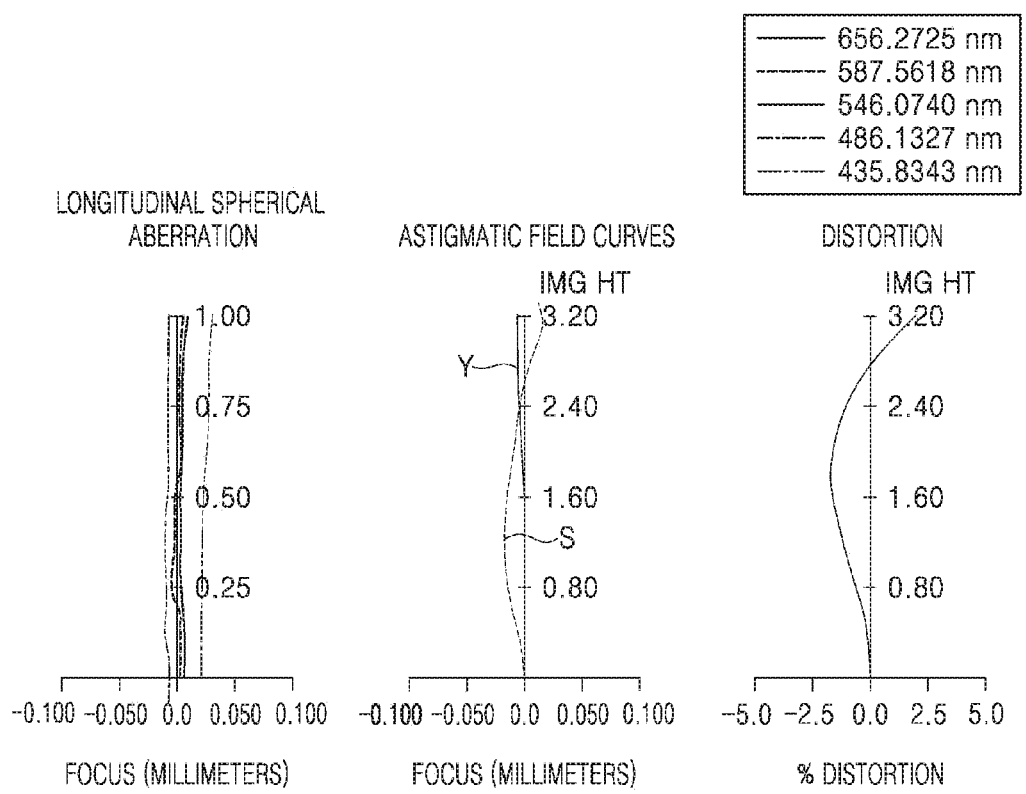
FIG. 15 is an aberration diagram of the optical lens assembly according to the seventh numerical embodiment from among various embodiments.

FIG. 15 illustrates longitudinal spherical aberration, astigmatic field curves, and distortion of the optical lens assembly 100-7 according to the seventh numerical embodiment of the disclosure.

Table 15 shows data of a focal length f, a field of view FOV, and an F number Fno of the optical lens assemblies according to the first to the seventh numerical embodiments.

Figure 17:
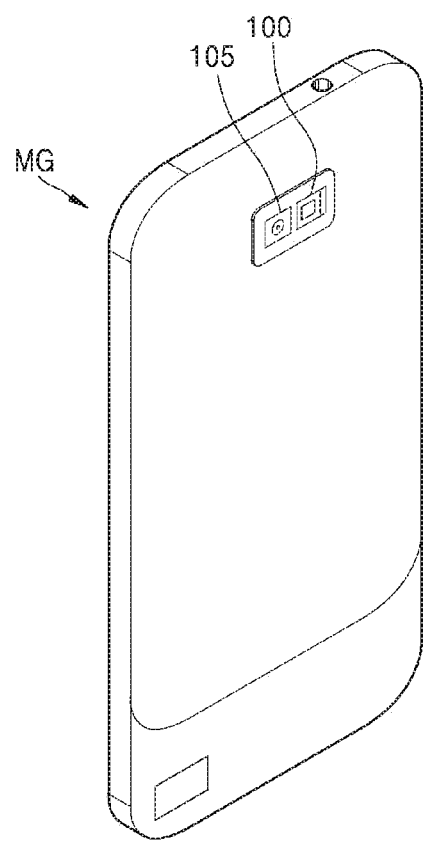
FIG. 17 illustrates an example of an electronic apparatus including two optical lens assemblies from among various embodiments.

An electronic apparatus MG illustrated in FIG. 17 may include the optical lens assembly 100, another optical lens assembly 105, and the image sensor 110. For example, the optical lens assembly 100 and the other optical lens assembly 105 may have different fields of view or different focal lengths. For example, the optical lens assembly 100 may be a telephoto lens system and the other optical lens assembly 105 may be a standard lens system. Alternatively, the optical lens assembly 100 may be a telephoto lens system, and the other optical lens assembly 105 may be a wide lens system. For example, the telephoto lens system may have a field of view of less than or equal to 23°. As such, the electronic apparatus MG may include a plurality of optical lens assemblies, and photos may be taken by selectively using the optical lens assemblies. Alternatively, by synthesizing images respectively taken by the optical lens assembly 100 and the other optical lens assembly 105, an image may be generated which has a field of view (or a focal length) between a field of view (or a focal length) of the optical lens assembly 100 and a field of view (or a focal length) of the other optical lens assembly 105. Digital zoom may be

TABLE 15

|  | Embodiment 1 | Embodiment 2 | Embodiment 3 | Embodiment 4 | Embodiment 5 | Embodiment 6 | Embodiment 7 |
|---|---|---|---|---|---|---|---|
| Focal length (f) | 18.5 | 23 | 20.4 | 14.5 | 22 | 22 | 22 |
| Field of view (FOV) | 15.2° | 12.4° | 13.9° | 19.4° | 15° | 15° | 14° |
| Fno | 2.8 | 2.9 | 2.8 | 2.8 | 3.0 | 3.0 | 3.0 |

Table 16 shows that the optical lens assemblies according to the first to seventh numerical embodiments satisfy Inequalities 1 to 3.

implemented through the above image synthesis process. Accordingly, a zoom effect may be obtained by the optical lens assembly 100 that is of a compact telephoto type and the

TABLE 16

|  | Embodiment 1 | Embodiment 2 | Embodiment 3 | Embodiment 4 | Embodiment 5 | Embodiment 6 | Embodiment 7 |
|---|---|---|---|---|---|---|---|
| Id/f | 0.135 | 0.108 | 0.122 | 0.18 | 0.136 | 0.136 | 0.136 |
| TTL/f | 0.93 | 0.92 | 0.87 | 0.94 | 0.83 | 0.78 | 0.75 |
| ttIa/ttIb | 0.213 | 0.197 | 0.207 | 0.24 | N/A | N/A | N/A |

The optical lens assemblies according to various embodiments may be applied to, for example, electronic apparatuses employing image sensors. An optical lens assembly according to an embodiment may be applicable to various electronic apparatuses such as digital cameras, changeable lanes cameras, video cameras, mobile phone cameras, or cameras for compact mobile devices.

Figure 16:
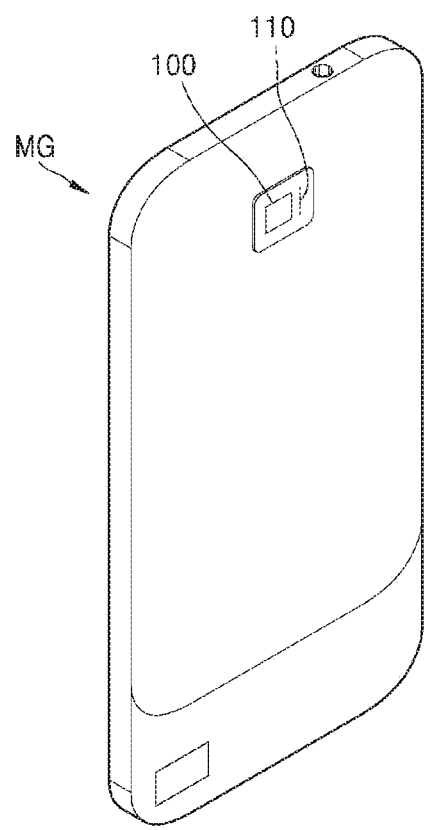
FIG. 16 illustrates an example of an electronic apparatus including an optical lens assembly from among various embodiments.

FIG. 16 illustrates an example of an electronic apparatus MG including an optical lens assembly, according to various embodiments. Although FIG. 16 illustrates an example in which the electronic apparatus MG is applied to a mobile phone, the disclosure is not limited thereto. The electronic apparatus MG may include at least one optical lens assembly 100 and an image sensor 110 for receiving an image formed by the optical lens assembly 100 and converting the image into an electric image signal. The optical lens assemblies described with reference to FIGS. 1 to 15 may be employed as the optical lens assembly 100. As the optical lens assembly according to various embodiments is applied to a photographing apparatus such as a compact digital camera or a mobile phone, a photographing apparatus capable of photographing with telephoto and high performance may be implemented.

other optical lens assembly 105. According to various embodiments, the telephoto optical lens assembly 100 and the other optical lens assembly 105 may implement a zoom magnification in a range of about 4 to 12 times.

To obtain a high-quality, high-magnification zoom image in a compact mobile device, the optical lens assembly according to various embodiments suggests a folded telephoto lens system for bending an optical path.

The folded telephoto lens system according to various embodiments is arranged with a wide lens system as multi camera modules in a compact mobile device, and thus a high-resolution, high-magnification zoom image may be obtained. As such, when several camera modules having different fields of view are arranged in a mobile device, it may be necessary to reduce a difference that may be generated during synthesis of images having different fields of view, for example, image blur according to defocus, ambient light ratio, white balance, or image connection portion processing. In order to smoothly process a portion for connecting images of different fields of view, the arrangement of a multi-module camera and the arrangement of a sensor are important.

For example, as a telephoto camera module having the maximum zoom magnification with respect to a wide camera module is arranged and a middle camera module is arranged between a wide and a telephoto as necessary, a high quality, high magnification zoom image may be obtained.

As such, an effect such as a continuous optical zoom function may be obtained by using a multi-module. When a zoom effect is obtained by using the multi-module, a thin lens system may be provided compared to a case in which zoom is implemented by using a single module.

Figure 18:
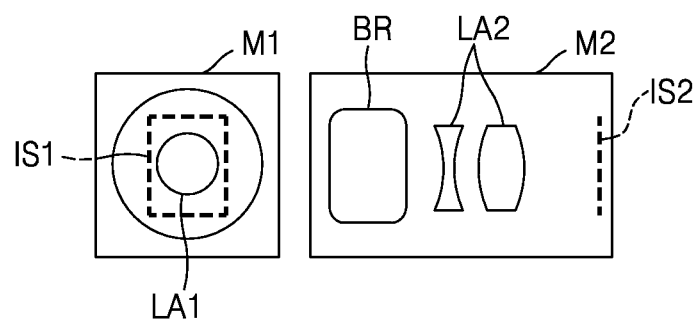
FIG. 18 illustrates an example in which two optical lens assembly modules are arranged.

FIG. 18 illustrates an example in which a first optical lens assembly module M1 and a second optical lens assembly module M2 are provided. The first optical lens assembly module M1 and the second optical lens assembly module M2 may be arranged adjacent to each other in the electronic apparatus. For example, the first optical lens assembly module M1 may include a wide lens system, and the second optical lens assembly module M2 may include a telephoto lens system. The first optical lens assembly module M1 may include lenses LA1 and a first image sensor IS1. The second optical lens assembly module M2 may include a bending portion BR, lenses LA2, and a second image sensor IS2. The lenses LA1 may be arranged in a direction perpendicular to the drawing surface, and the lenses LA2 may be arranged in a horizontal direction on the drawing. The bending portion BR may be located relatively close to the first optical lens assembly module M1, and the second image sensor IS2 may be located relatively far from the first optical lens assembly module M1. When an image captured by the first optical lens assembly module M1 and an image captured by the second optical lens assembly module M2 are synthesized, the quality of a synthesized image may be improved when the two images are captured at positions located as close to each other as possible. For example, when the first optical lens assembly module M1 has a first field of view and the first optical lens assembly module M1 has a second field of view, the image captured by the first optical lens assembly module M1 and the image captured by the second optical lens assembly module M2 are synthesized to generate an image having a third field of view between the first field of view and the second field of view, thereby obtaining a zoom image. Since the image captured by the second optical lens assembly module M2 is determined by the position of the bending portion BR on which light is first incident, the position of the bending portion BR is important.

Although the lenses LA2 are briefly illustrated for convenience of explanation, the disclosure is not limited thereto, and the embodiments described with reference to FIGS. 1 to 15 may be applied thereto.

Figure 19:
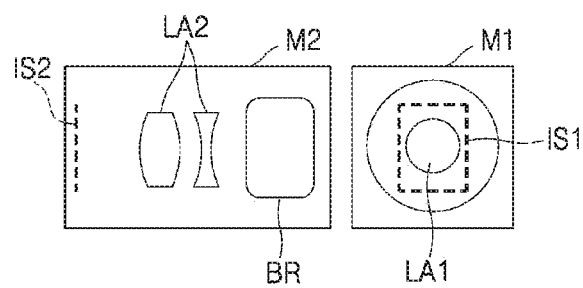
FIG. 19 illustrates an example in which the positions of the two optical lens assembly modules of FIG. 18 are switched.

FIG. 19 illustrates an example in which the positions of the first optical lens assembly module M1 and the second optical lens assembly module M2 are switched, compared to those of FIG. 18. Even when the positions of the first optical lens assembly module M1 and the second optical lens assembly module M2 are switched, the bending portion BR may be located relatively close to the first optical lens assembly module M1, and the second image sensor IS2 may be located relatively far from the first optical lens assembly module M1.

Figure 20:
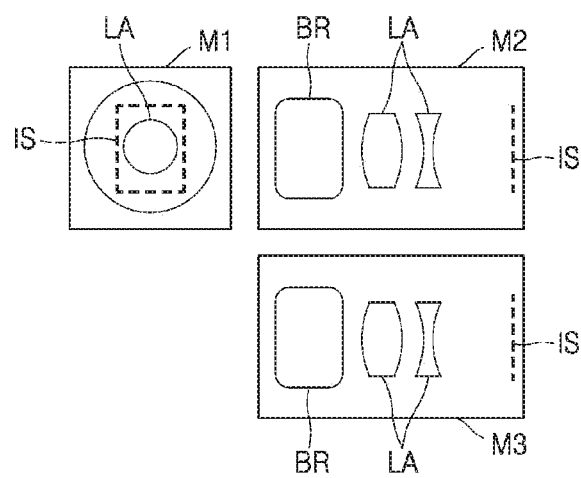
FIG. 20 illustrates an example in which three optical lens assembly modules are arranged.

FIG. 20 illustrates an example in which the first optical lens assembly module M1, the second optical lens assembly module M2, and a third optical lens assembly module M3 are provided. For example, the first optical lens assembly module M1 may include a wide lens system having a first field of view, the second optical lens assembly module M2 may include a telephoto lens system having a second field of view, and the third optical lens assembly module M3 may include a telephoto lens system having a third field of view. Alternatively, for example, the first optical lens assembly module M1 may include a wide lens system having a first field of view, the second optical lens assembly module M2 may include a standard lens system having a second field of view, and the third optical lens assembly module M3 may include a telephoto lens system having a third field of view.

In the system according to the present embodiment, a relationship a first field of view>a second field of view>a third field of view may be established. For example, the first to third optical lens assemblies may be arranged adjacent to one another in an order according to the amount of a field of view.

The first optical lens assembly module M1 may include lenses LA and an image sensor IS. The second optical lens assembly module M2 may include a bending portion BR, lenses LA, and an image sensor IS. The third optical lens assembly module M3 may include a bending portion BR, lenses LA, and an image sensor IS. The lenses LA of the first optical lens assembly module M1 may be arranged in a direction perpendicular to the drawing surface, and the lenses LA of the second optical lens assembly module M2 in a horizontal direction on the drawing. The lenses LA of the third optical lens assembly module M3 may be arranged in a horizontal direction on the drawing.

The bending portion BR of the second optical lens assembly module M2 may be located relatively close to the first optical lens assembly module M1, and the bending portion BR of the third optical lens assembly module M3 may be located relatively close to the bending portion BR of the second optical lens assembly module M2.

FIG. 20 illustrates an example in which the first optical lens assembly module M1 is located at the left of the second optical lens assembly module M2 and the third optical lens assembly module M3 on the drawing. Alternatively, the first optical lens assembly module M1 may be located at the right of the second optical lens assembly module M2 and the third optical lens assembly module M3. In this case, the bending portion BR of the second optical lens assembly module M2 may be located relatively close to the first optical lens assembly module M1, and the bending portion BR of the third optical lens assembly module M3 may be relatively close to the bending portion BR of the second optical lens assembly module M2.

As the image captured by the first optical lens assembly module M1 and the image captured by the second optical lens assembly module M2 are synthesized to generate an image having a field of view A between the first field of view and the second field of view, a zoom image may be obtained. Furthermore, as the image captured by the second optical lens assembly module M2 and the image captured by the third optical lens assembly module M3 are synthesized to generate an image having a field of view B between the second field of view and a third field of view, a zoom image may be obtained. As such, zoom magnification may be increased by using three or more optical lens assembly modules. Furthermore, when a difference between the first field of view and the third field of view is great, compared to the synthesis of the image having the first field of view and the image having the third field of view, synthesizing an image having the first field of view and an image having the second field of view, and an image having the second field of view and an image having the third field of view, and then synthesizing the two synthesized images may improve the quality of a digital zoom image. Accordingly, by appropriately adjusting the numbers and positions of optical lens assembly modules, zoom magnification may be increased, and a high quality image may be obtained.

Figure 21:
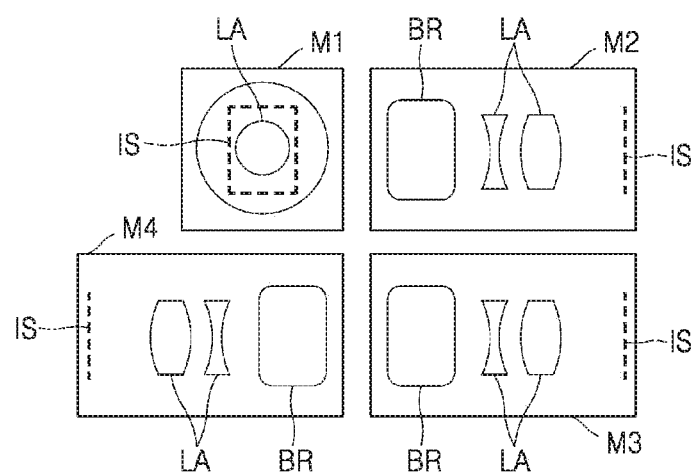
FIG. 21 illustrates an example in which four optical lens assembly modules are arranged.

FIG. 21 illustrates an example in which the first optical lens assembly module M1, the second optical lens assembly module M2, the third optical lens assembly module M3, and a fourth optical lens assembly module M4 are provided. For example, the first optical lens assembly module M1 may include a wide lens system having a first field of view, the second optical lens assembly module M2 may include a standard lens system having a second field of view, the third optical lens assembly module M3 may include a telephoto lens system having a third field of view, and the fourth optical lens assembly module M4 may include a telephoto lens system having a fourth field of view. Alternatively, for example, the first optical lens assembly module M1 may include a wide lens system having a first field of view, the second optical lens assembly module M2 may include a telephoto lens system having a second field of view, the third optical lens assembly module M3 may include a telephoto lens system having a third field of view, and the fourth optical lens assembly module M4 may include a telephoto lens system having the fourth field of view.

In the system according to the present embodiment, a relationship the first field of view>the second field of view>the third field of view>the fourth field of view may be established. The first optical lens assembly module M1 may include the lenses LA and the image sensor IS. The second optical lens assembly module M2 may include the bending portion BR, the lenses LA, and the image sensor IS. The third optical lens assembly module M3 may include the bending portion BR, the lenses LA, and the image sensor IS. The fourth optical lens assembly module M4 may include the bending portion BR, the lenses LA, and the image sensor IS. The lenses LA of the first optical lens assembly module M1 may be arranged in a direction perpendicular to the drawing surface, and the lenses LA of the second, third, and fourth optical lens assembly modules M2, M3, and M4 may be arranged in a horizontal direction on the drawing.

The bending portion BR of the second optical lens assembly module M2 may be located relatively close to the first optical lens assembly module M1, and the bending portion BR of the third optical lens assembly module M3 may be located relatively close to the bending portion BR of the second optical lens assembly module M2. The bending portion BR of the fourth optical lens assembly module M4 may be located relatively close to the bending portion BR of the third optical lens assembly module M3. In other words, the lenses LA of the first optical lens assembly module M1 and the bending portions BRs of the second, third, and fourth optical lens assembly modules M2, M3, and M4 may be arranged close to a center portion.

As the image captured by the first optical lens assembly module M1 and the image captured by the second optical lens assembly module M2 are synthesized to generate the image having a field of view A between the first field of view and the second field of view, a zoom image may be obtained. Furthermore, as the image captured by the second optical lens assembly module M2 and the image captured by the third optical lens assembly module M3 are synthesize to generate the image having a field of view B between the second field of view and the third field of view, a zoom image may be obtained. Furthermore, as the image captured by the third optical lens assembly module M3 and the image captured by the fourth optical lens assembly module M4 are synthesized to generate an image having a field of view C between the third field of view and the fourth field of view, a zoom image may be obtained. As such, zoom magnification may be increased by using a plurality of optical lens assemblies modules. Furthermore, when a difference between the first field of view and the fourth field of view is great, compared to synthesizing the image having the first field of view and the image having the fourth field of view, synthesizing stepwise the image having the first field of view, the image having the second field of view, the image having the third field of view, and the image having the fourth field of view may improve the quality of a digital zoom image. Accordingly, by appropriately adjusting the number and position of optical lens assembly modules, zoom magnification may be increased, and a high quality image may be obtained.

Figure 22:
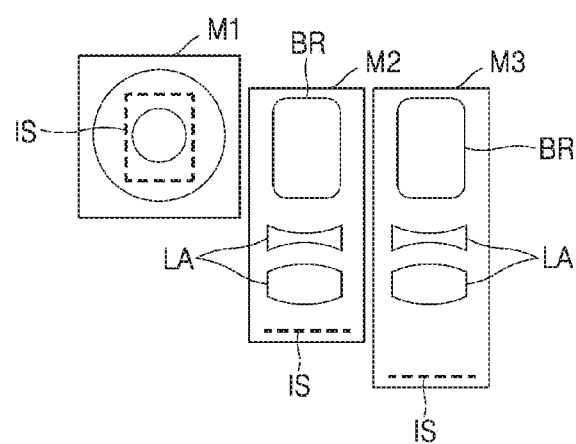
FIG. 22 illustrates another example in which three optical lens assembly modules are arranged.

FIG. 22 illustrates an example in which the first optical lens assembly module M1, the second optical lens assembly module M2, and the third optical lens assembly module M3 are provided. Compared to FIG. 20, the arrangement of the first, second, and third optical lens assembly modules M1, M2, and M3 is changed. When the lenses LA of the first optical lens assembly module M1 are arranged in a direction perpendicular to the drawing surface, the lenses LA of the second optical lens assembly module M2 may be arranged in a vertical direction on the drawing surface. The lenses LA of the third optical lens assembly module M3 may be arranged in a vertical direction on the drawing surface. The second optical lens assembly module M2 is located adjacent to the first optical lens assembly module M1, and the third optical lens assembly module M3 may be arranged adjacent to and parallel to the second optical lens assembly module M2. In this case, the bending portion BR of the second optical lens assembly module M2 and the bending portion BR of the third optical lens assembly module M3 are arranged close to each other.

Figure 23:
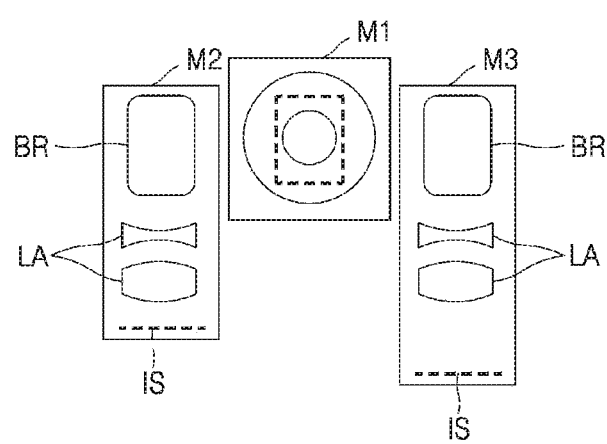
FIG. 23 illustrates another example in which three optical lens assembly modules are arranged.

FIG. 23 illustrates an example in which the second optical lens assembly module M2 is arranged at the left side of the first optical lens assembly module M1 on the drawing surface, and the third optical lens assembly module M3 is arranged at the right side of the first optical lens assembly module M1 on the drawing surface.

Figure 24:
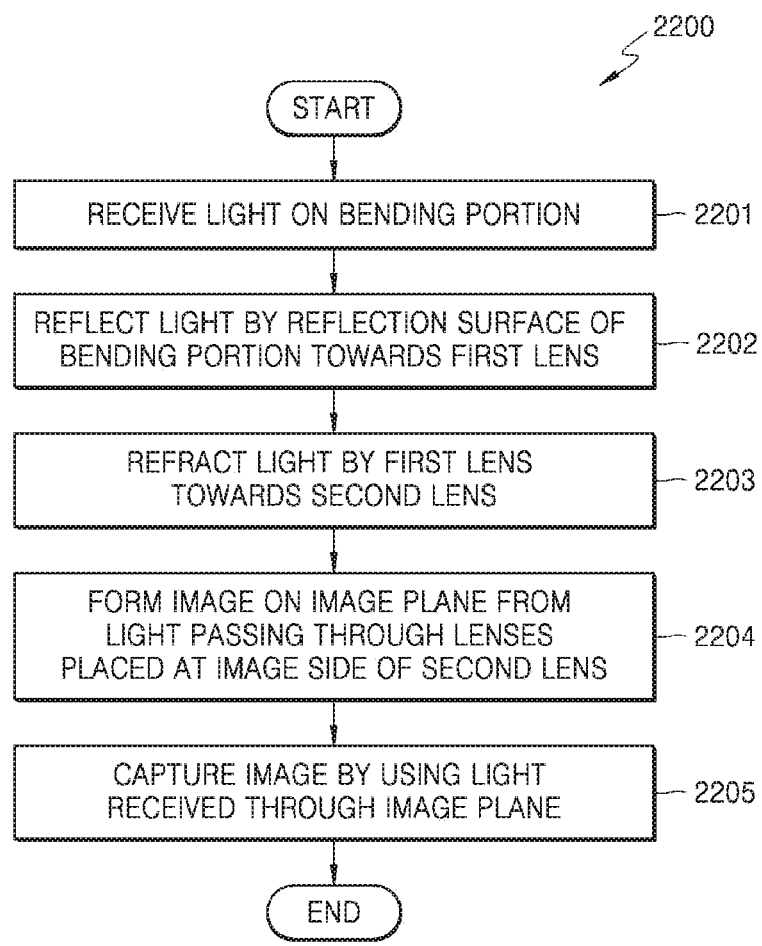
FIG. 24 is a high-level flowchart of a method of performing image capturing by using an optical lens assembly in an electronic apparatus, according to various embodiments.

FIG. 24 is a high-level flowchart 2200 of a method of performing image capturing by using the optical lens assemblies 100-1, 100-2, 100-3, 100-4, 100-5, 100-6, and 100-7 illustrated in FIGS. 1, 4, 6, 8, 10, 12, and 14, in an electronic apparatus according to various embodiments.

According to an embodiment, in operation 2201, for example, the optical lens assemblies 100-1, 100-2, 100-3, 100-4, 100-5, 100-6, and 100-7 may receive light on the bending portions BR-1, BR-2, BR-3, BR-4, BR-5, BR-6, and BR-7 which are included in the above optical lens assemblies.

In operation 2202, the light may be reflected by the reflection surfaces of the bending portions BR-1, BR-2, BR-3, BR-4, BR-5, BR-6, and BR-7 towards the first lenses L1-1, L1-2, L1-3, L1-4, L1-5, L1-6, and L1-7.

In operation 2203, for example, the first lenses L1-1, L1-2, L1-3, L1-4, L1-5, L1-6, and L1-7 included in the optical lens assemblies may refract the light towards the second lenses L2-1, L2-2, L2-3, L2-4, L2-5, L2-6, and L2-7.

In operation 2204, for example, in each optical lens assembly, the light having passed through the lenses placed on the image side of the second lens may form an image on the image plane IMG.

Figure 26:
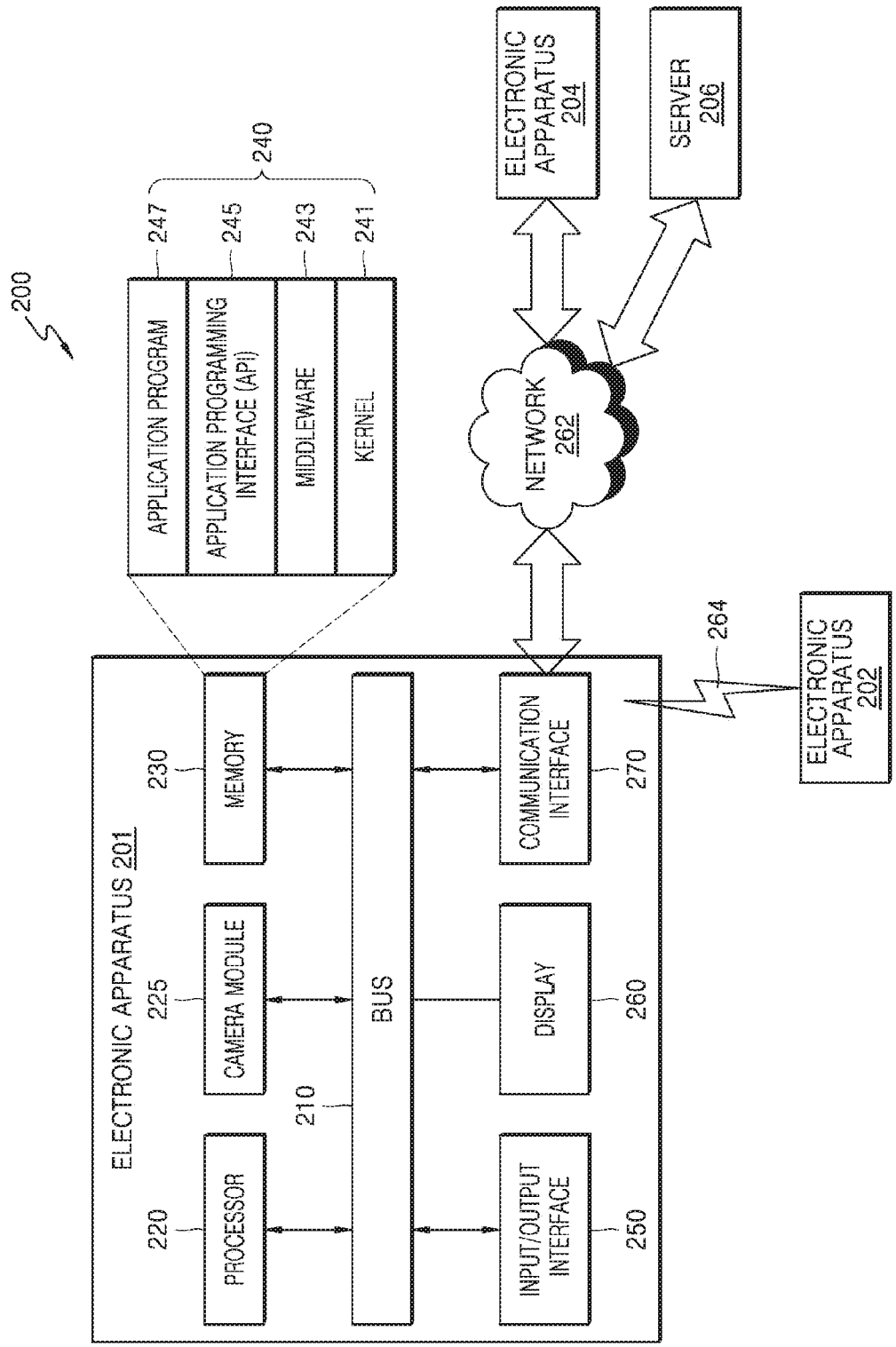
FIG. 26 illustrates a network environment system, according to various embodiments.
Figure 27:
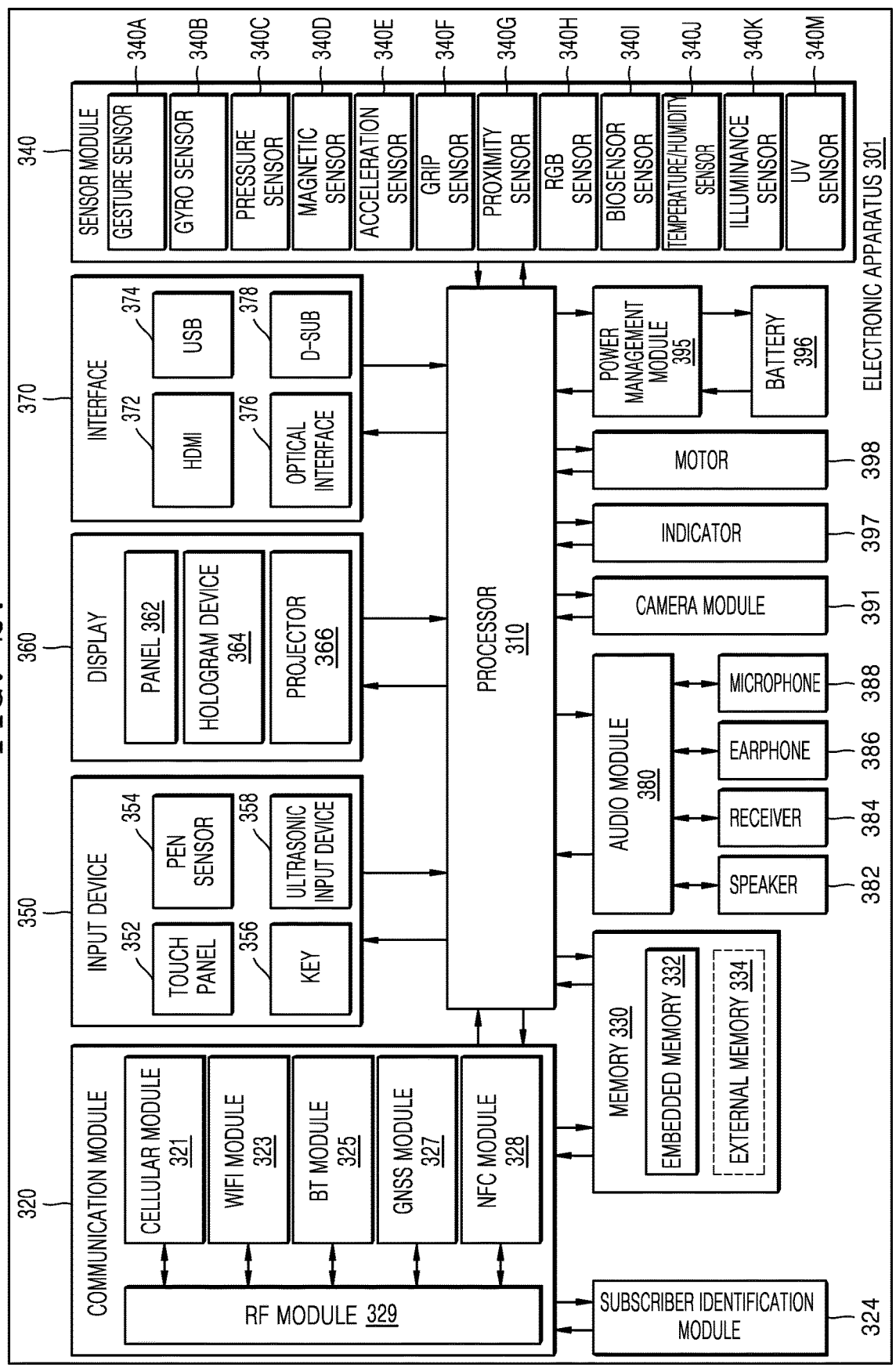
FIG. 27 is a block diagram of an electronic apparatus, according to various embodiments.

In operation 2205, for example, the electronic apparatus including the optical lens assembly, e.g., the electronic apparatus 201 of FIG. 26 and the electronic apparatus 301 of FIG. 27, may capture the image by using the light received through the image plane IMG. For example, the image may be captured by using the camera module, e.g., the image sensor (not shown) forming at least a part of the camera module 225 of FIG. 26 and the camera module 391 of FIG. 27.

Figure 25:
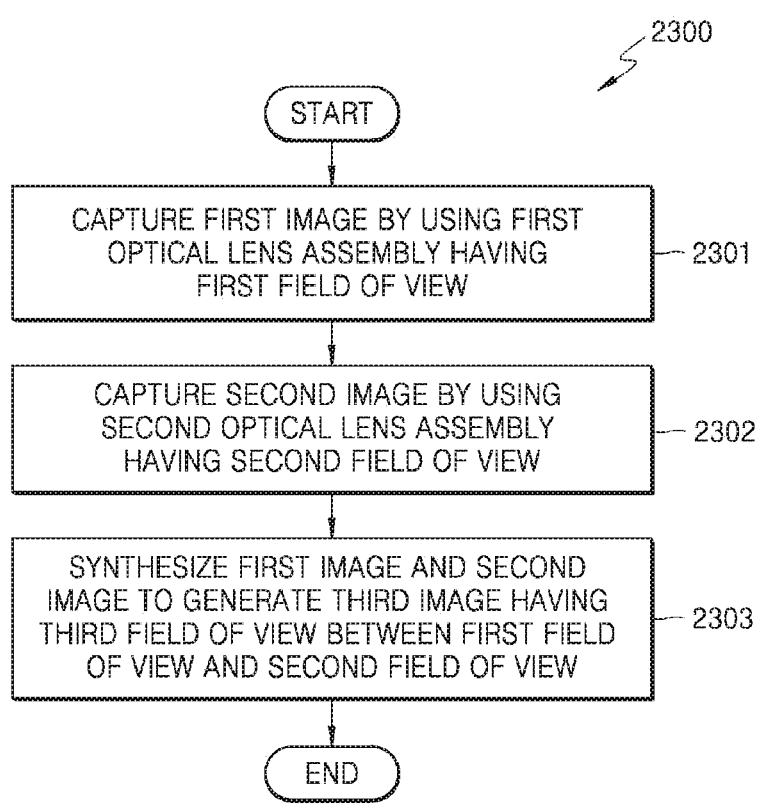
FIG. 25 is a high-level flowchart of a method of performing image capturing by using two optical lens assemblies in an electronic apparatus, according to various embodiments.

FIG. 25 is a high-level flowchart 2300 of a method of performing image capturing by using a multi-module in an electronic apparatus, according to various embodiments.

According to an embodiment, in operation 2301, for example, a first image is captured by using a first optical lens assembly having a first field of view. The first optical lens assembly may be, for example, a wide lens system.

In operation 2302, for example, a second image is captured by using a second optical lens assembly having a second field of view. The second optical lens assembly may be, for example, a telephoto lens system according to various embodiments.

In operation 2303, for example, the first image and the second image are synthesized to generate a third image having a third field of view between the first field of view and the second field of view. Accordingly, a digital zoom effect may be obtained in a range between the first field of view and the second field of view.

Referring to FIG. 26, in various embodiments, an electronic apparatus 201 is provided in a network environment 200. The electronic apparatus 201 may include a bus 210, a processor 220, a camera module 225, a memory 230, an input/output interface 250, a display 260, and a communication interface 270. In an embodiment, at least one of constituent elements of the electronic apparatus 201 may be omitted or another constituent element may be additionally included therein.

The bus 210 may connect, for example, the constituent elements 210 to 270 to one another, and may include a circuit for transmitting communication (e.g., control message and/or data) between the constituent elements.

The processor 220 may include one or more of a central processing unit (CPU), an application processor (AP), and a communication processor (CP). The processor 220 may perform, for example, operation or data processing regarding control and/or communication of at least one of other constituent elements of the electronic apparatus 201.

The camera module 225, which is an apparatus for capturing, for example, a still image and a video, may include, according to an embodiment, one or more of image sensors (e.g., a front sensor or a rear sensor), lenses, image signal processors (ISP), or flashes (e.g., LEDs or xenon lamps). For example, the optical lens assembly according to various embodiments maybe applied to the camera module 225.

The memory 230 may include volatile memory and/or non-volatile memory. The memory 230 may store, for example, instructions or data related to at least one of other constituent elements of the electronic apparatus 201. According to an embodiment, the memory 230 may store software and/or a program 240. The program 240 may include, for example, a kernel 241, middleware 243, an application programming interface (API) 245, and/or an application program (or "application") 247. At least some of the kernel 241, the middleware 243, and the API 245 may be referred to as an operating system (OS).

The kernel 241 may control or manage, for example, system resources such as the bus 210, the processor 220, or the memory 230 used to perform an operation or function implemented in other programs such as the middleware 243, the API 245, or the application program 247. Furthermore, the kernel 241 may provide an interface for controlling or managing system resources to allow the middleware 243, the API 245, or the application program 247 to access an individual constituent element of the electronic apparatus 201 may access the middleware 243, the API 245, or the application program 247.

The middleware 243 may perform intermediation so that, for example, the API 245 or the application program 247 may exchange data by communicating with the kernel 241.

Furthermore, the middleware 243 may process one or more job requests received from the application program 247 according to priority. For example, the middleware 243 may allot at least one of the application programs 247 a priority to use system resources such as the bus 210, the processor 220, or the memory 230 of the electronic apparatus 201. For example, the middleware 243 may perform scheduling or load balancing with respect to the one or more job requests, by processing the one or more job requests according to the priority allotted to the at least one of the application programs 217.

The API 245 is an interface to provide functions provided by, for example, the application 247 through the kernel 241 or the middleware 243, and may include, for example, at least one interface or function, such as instructions, for file control, window control, or character control.

The input/output interface 250 may serve as an interface to transmit, for example, commands or data input by a user or other external device, to other constituent element(s) of the electronic apparatus 201. Furthermore, the input/output interface 250 may output commands or data received from other constituent element(s) of the electronic apparatus 201 to a user or other external device.

The display 260 may include, for example, a liquid crystal display (LCD), a light-emitting diode (LED) display, an organic light-emitting diode (OLED) display, or a microelectromechanical systems (MEMS) display, or an electronic paper display. The display 260 may display, for example, various contents such as texts, images, videos, icons, or symbols to the user. The display 260 may include a touch screen and may receive, for example, touch, gesture, proximity, or hovering inputs using an electronic pen or a part of a user's body.

The communication interface 270 may set communication between, for example, the electronic apparatus 201 and an external device such as an electronic apparatus 202, an electronic apparatus 204, or a server 206. For example, the communication interface 270 may be connected to a network 262 via wireless communication or wired communication and communicate with an external device such as the second external electronic apparatus 204 or the server 206.

The wireless communication may use, for example, as a cellular communication protocol, for example, at least one of long-term evolution (LTE), LTE Advance (LTE-A), code division multiple access (CDMA), wideband CDMA (WCDMA), a universal mobile telecommunications system (UMTS), wireless broadband (WiBro), and a global system for mobile communications (GSM). Furthermore, the wireless communication may include, for example, a short-range communication. The short-range communication 264 may include, for example, at least one of wireless fidelity (WiFi), Bluetooth, near field communication (NFC), and global navigation satellite system (GNSS). The GNSS may include, according to a used area or a bandwidth, for example, at least one of a global positioning system (GPS), a global navigation satellite system (Glonass), a Beidou navigation satellite system (hereinafter, referred to as the "Beidou"), and Galileo or the European global satellite-based navigation system. In the present disclosure, "GPS" may be interchangeably used with "GNSS". The wired communication may include, for example, at least one of a universal serial bus (USB), a high definition multimedia interface (HDMI), recommended standard-232 (RS-232), and a plain old telephone service (POTS). The network 262 may include a telecommunications network, for example, at least one of a computer network such as LAN or WAN, the Internet, and a telephone network.

Each of the first and second external electronic apparatuses 202 and 204 may be a device that is the same as or different from the electronic apparatus 201. According to an embodiment, the server 206 may include a group of one or more servers. According to various embodiments, the whole or part of operations performed on the electronic apparatus 201 may be performed on another electronic apparatus or a plurality of electronic apparatuses, for example, the electronic apparatuses 202 and 204 or the server 206. According to an embodiment, when the electronic apparatus 201 performs a certain function or service automatically or on a request, the electronic apparatus 201, instead of or in addition to performing the function or service therein, may request another device, for example, the electronic apparatuses 202 and 204, or the server 206 to perform at least part of the function related thereto. Another electronic apparatus, for example, the electronic apparatuses 202 and 204 or the server 206, may perform the requested function or additional function and transmit a result thereof to the electronic apparatus 201. The electronic apparatus 201 may process a received result without change or additionally and provide the requested function or service. To this end, for example, cloud computing, distributed computing, or client-server computing technology may be used.

FIG. 27 is a block diagram of an electronic apparatus 301 according to various embodiments. The electronic apparatus 301 may include, for example, the whole or part of the electronic apparatus 201 of FIG. 26. The electronic apparatus 301 may include one or more processors, for example, a processor or application processor (AP) 310, a communication module 320, a subscriber identification module 324, a memory 330, a sensor module 340, an input device 350, a display 360, an interface 370, an audio module 380, a camera module 391, a power management module 395, a battery 396, an indicator 397, and a motor 398.

The processor 310 may control a plurality of hardware or software constituent elements connected to the processor 310 by driving, for example, an operating system or an application program, and may perform various data processing and operations. The processor 310 may be implemented by, for example, a system-on-chip (SoC). According to an embodiment, the processor 310 may further include a graphic processing unit (GPU) and/or an image signal processor. The processor 310 may include at least part of the constituent elements of FIG. 27, for example, a cellular module 321. The processor 310 may process commands or data received from at least one of other constituent elements, for example, a non-volatile memory, by loading the commands or data on a volatile memory, and may store various pieces of data in the non-volatile memory.

The communication module 320 may have a configuration that is the same or similar to that of the communication interface 270 of FIG. 26. The communication module 320 may include, for example, the cellular module 321, a WiFi module 323, a Bluetooth module 325, a GNSS module 327 such as a GPS module, a Glonass module, a Beidou module, or a Galileo module, a NFC module 328, or a radio frequency (RF) module 329.

The cellular module 321 may provide, for example, a voice call, a video call, a text service, or the Internet service through a communication network. According to an embodiment, the cellular module 321 may perform classification and authentication of the electronic apparatus 301 in the communication network by using a subscriber identification module 324, for example, a SIM card. According to an embodiment, the cellular module 321 may perform at least some of functions provided by the processor 310. According to an embodiment, the cellular module 321 may a communication processor CP.

Each of the WiFi module 323, the Bluetooth module 325, the GNSS module 327 and the NFC module 328 may include, for example, a processor for processing data transceived through a corresponding module. In some embodiments, at least two, for example, two or more, of the cellular module 321, the WiFi module 323, the Bluetooth module 325, the GNSS module 327, and the NFC module 328 may be included in one integrated chip IC or an IC package.

The RF module 329 may transceive, for example, a communication signal, for example, an RF signal. The RF module 329 may include, for example, a transceiver, a power amp module (PAM), a frequency filter, a low noise amplifier (LNA), or an antenna. In another embodiment, at least one of the cellular module 321, the WiFi module 323, the Bluetooth module 325, the GNSS module 327, and the NFC module 328 may transceive an RF signal through a separate RF module.

The subscriber identification module 324 may include, for example, a card and/or embedded SIM including a subscriber identification module, unique identification information, for example, an integrated circuit card identifier (IC-CID), or subscriber information, for example, international mobile subscriber identity (IMSI).

The memory 330 may include, for example, an embedded memory 332 or an external memory 334. The embedded memory 332 may include at least one of, for example, volatile memory such as dynamic RAM (DRAM), static RAM (SRAM), or synchronous dynamic RAM (SDRAM), and non-volatile memory such as one time programmable ROM (OTPROM), programmable ROM (PROM), erasable and programmable ROM (EPROM), electrically erasable and programmable ROM (EEPROM), mask ROM, flash ROM, flash memory, for example, NAND flash or NOR flash, hard disk drives, or solid state drives (SSD).

The external memory 334 may further include a flash drive such as compact flash (CF), secure digital (SD), micro secure digital (Micro-SD), mini secure digital (Mini-SD), extreme digital (xD), multi-media card (MMC), or memory stick. The external memory 334 may be functionally and/or physically connected with the electronic apparatus 301 via various interfaces.

The sensor module 340 may, for example, measure a physical quantity or detect an operational state of the electronic apparatus 301, and may convert measured or detected information to an electrical signal. The sensor module 340 may include at least one of, for example, a gesture sensor 340A, a gyro sensor 340B, a pressure sensor 340C, a magnetic sensor 340D, an acceleration sensor 340E, a grip sensor 340F, a proximity sensor 340G, a color sensor 340H, for example, red, green, and blue (RGB) sensors, a biosensor 340I, a temperature/humidity sensor 340J, an illuminance sensor 340K, or an ultra violet (UV) sensor 340M. Additionally or alternatively, the sensor module 340 may include, for example, an E-nose sensor, an electromyography (EMG) sensor, an electroencephalogram (EEG) sensor), an electrocardiogram (ECG) sensor, an infrared (IR) sensor, an iris sensor, and/or a fingerprint sensor. The sensor module 340 may further include a control circuit for controlling at least one of sensors provided therein. In an embodiment, the electronic apparatus 301 may further include a processor configured to control the sensor module 340, as a part of or separated from the processor 310, thereby controlling the sensor module 340 while the processor 310 is in a sleep state.

The input device 350 may include, for example, a touch panel 352, a (digital) pen sensor 354, a key 356, or an ultrasonic input device 358. The touch panel 352 may employ at least one of, for example, a capacitive method, a resistive method, an infrared method, and an ultrasonic method. Furthermore, the touch panel 352 may further include a control circuit. The touch panel 352 may further include a tactile layer and may provide a tactile response to a user.

The (digital) pen sensor 354 may include, for example, a recognition sheet that is a part of a touch panel or separate therefrom. The key 356 may include, for example, a physical button, an optical key, or a keypad. The ultrasonic input device 358 may detect ultrasound generated from an input device through a microphone, for example, the microphone 388, and check data corresponding to the detected ultrasound.

The display 360 may include a panel 362, a hologram device 364, or a projector 366. The panel 362 may same configuration as or a similar configuration to the display 260 of FIG. 26. The panel 362 may be, for example, flexible, transparent, or wearable. The panel 362 may be one module with the touch panel 352. According to an embodiment, the panel 362 may include a pressure sensor or a force sensor that may measure the intensity of pressure of a user's touch. The pressure sensor may include one or more sensors that are integral with the touch panel 352 or separate from the touch panel 352. The hologram device 364 may display a three-dimensional image in the air using interference of light. The projector 366 may display an image by projecting light onto a screen. The screen may be located, for example, inside or outside the electronic apparatus 301. According to an embodiment, the display 360 may further include a control circuit for controlling the panel 362, the hologram device 364, or the projector 366.

The interface 370 may include, for example, a high-definition multimedia interface (HDMI) 372, a universal serial bus (USB) 374, an optical interface 376, or a D-subminiature 378. The interface 370 may be included in, for example, the communication interface 270 of FIG. 26. Additionally or alternatively, the interface 370 may include, for example, a mobile high-definition link (MHL) interface, a secure digital (SD) card/a multi-media card (MMC) interface, or an infrared data association (IrDA) specification interface.

The audio module 380 may convert, for example, a sound and electrical signal in bi-direction. At least some of constituent elements of the audio module 380 may be included into, for example, input/output interface 250 of FIG. 26. The audio module 380 may process sound information input or output through, for example, a speaker 382, a receiver 384, an earphone 386, or a microphone 388.

The camera module 391, which is a device for capturing, for example, a still image and a video, may include one or more image sensors, for example, a front sensor or a rear sensor, a lens, an image signal processor (ISP), or a camera flash, for example, an LED or xenon lamp, According to an embodiment, for example, the optical lens assembly according to various embodiments may be applied to the camera module 391.

The power management module 395 may manage electric power of, for example, the electronic apparatus 301. The electronic apparatus 301 may be an electronic apparatus that receives electric power through a battery, but the present disclosure is not limited thereto. According to an embodiment, the power management module 395 may include a power management integrated circuit (PMIC), a charger integrated circuit (IC), a battery, or a fuel gauge. The PMIC may have a wired and/or wireless charging system. A wireless charging system may include, for example, a magnetic resonance method, a magnetic induction method, or an electromagnetic wave method, and may further include an additional circuit for wireless charging, for example, a coil loop, a resonant circuit, or a rectifier. A battery gauge may measure, for example, a remaining amount, a voltage, current, or temperature during charging of the battery 396. The battery 396 may include, for example, a rechargeable battery and/or a solar battery.

The indicator 397 may display a particular state, for example, the processor 310, for example, a booting state, a message state, or a charge state, of the electronic apparatus 301 or a part thereof. The motor 398 may convert an electrical signal to mechanical vibration, thereby generating vibration or a haptic effect. Although not illustrated, the electronic apparatus 301 may include a processing device for supporting a mobile TV, for example, a GPU. The processing device for supporting a mobile TV may process media data according to specifications, for example, digital multimedia broadcasting (DMB), digital video broadcasting (DVB), or mediaFlo™.

An optical lens assembly includes a bending portion including a reflection surface for reflecting light and at least one surface having refractive power, and a plurality of lenses arranged between the bending portion and an image plane, wherein the optical lens assembly satisfies following inequalities:

$$0.06 \leq Id/f \leq 0.2,$$

$$TTL/f \leq 1.0, \text{ and}$$

$$ttla/ttlb \leq 0.4,$$

wherein "Id" denotes an image height, "f" denotes a total focal length of the optical lens assembly, "TTL" denotes a total length of the optical lens assembly, "ttla" denotes a distance along an optical axis from an object side surface to the reflection surface of the bending portion, and "ttlb" denotes a distance along the optical axis from the reflection surface of the bending portion to the image plane.

The bending portion may have positive refractive power.

The bending portion may have an Abbe number greater than or equal to about 50.

The bending portion may include plastic.

Among the plurality of lenses, a first lens located closest to an object side may have an Abbe number less than about 35, and a second lens located next to the first lens may have an Abbe number greater than or equal to about 50.

The second lens may have positive refractive power, a third lens next to the second lens may have negative refractive power, and the second lens and the third lens may perform focusing and anti-hand shaking.

The image height Id may be less than or equal to about 4 mm.

Among the plurality of lenses, a lens located closest to an image side may have positive refractive power.

The bending portion may include an object side surface convex towards an object side and an image side surface convex towards an image side.

An optical lens assembly includes a bending portion configured to bend an optical path by reflecting light, and six or more lenses arranged between the bending portion and an image plane, wherein, when a distance from an object side surface of a lens located closest to an object side among the six or more lenses to an image plane is TTL, and a focal length is f, the optical lens assembly satisfies relation 0.75≤TTL/f≤1.0.

The bending portion may include a reflection mirror.

All of the plurality of lenses may include plastic.

For example, each of the first lens located closest to the object side among the lenses and the second lens next to the first lens may have an Abbe number greater than or equal to about 50.

When an image height is Id, relation 0.06≤Id/f≤0.2 may be satisfied.

An electronic apparatus includes a first optical assembly having a first field of view, and a second optical assembly having a second field of view greater than the first field of view, wherein the first optical assembly includes a bending portion including a reflection surface for reflecting light and at least one surface having refractive power, and a plurality of lenses arranged between the bending portion and an image plane, wherein the first optical lens assembly satisfies following inequalities:

$0.06 \le Id/f \le 0.2$, $TTL/f \le 1.0$, and $ttla/ttlb \le 0.4$, wherein "Id" denotes an image height, "f" denotes a total focal length of the optical lens assembly, "TTL" denotes a total length of the optical lens assembly, "ttla" denotes a distance along an optical axis from an object side surface to the reflection surface of the bending portion, and "ttlb" denotes a distance along the optical axis from the reflection surface of the bending portion to the image plane.

A first image captured by the first optical lens assembly and a second image captured by the second optical lens assembly may be synthesized to generate a third image having a third field of view between the first field of view and the second field of view.

For example, the electronic apparatus may further include at least one third optical lens assembly having a third field of view that is greater than the first field of view and less than the second field of view, and the first to third optical lens assemblies may be arranged close to one another in an order of the amount of a field of view.

Each of constituent elements described in the present disclosure may include one or more components, and the names of the constituent elements may vary according to the type of an electronic apparatus. In various embodiments, the electronic apparatus may include at least one of the constituent elements described in the present disclosure, and may not include some constituent elements or may further include additional other constituent elements. Furthermore, as some of constituent elements of the electronic apparatus according to various embodiments are coupled to form one entity, functions of the constituent elements before coupling may be performed in the same manner.

The term "module" used in various embodiments of the present disclosure may denote a unit including one or two or more combinations of, for example, hardware, software, or firmware. The module may be interchangeably used with terms for example, units, logics, logical blocks, components, or circuits. The module may be a minimum unit of a part that is integrally formed or a part thereof. The module may be a minimum unit performing one or more functions or a part thereof. The module may be embodied mechanically or electronically. For example, the modules according to various embodiments of the present disclosure may include at least one of an application-specific integrated circuit (ASIC) chip, field-programmable gate arrays (FPGAs), or a programmable-logic device, which performs a certain operation that is already known or will be developed in the future.

According to various embodiments, at least part of an apparatus, for example, modules or functions thereof, or a method, for example, operations, may be embodied by instructions stored in a computer-readable storage media in form of, for example, a programming module. When the instruction is executed by one or more processors, for example, the processor 220 of FIG. 26, the one or more processors may perform a function corresponding to the instruction. The computer-readable storage media may be, for example, the memory 230.

Examples of the computer-readable recording medium include magnetic media, e.g., hard disks, floppy disks, and magnetic tapes, optical media, e.g., compact disc read only memories (CD-ROMs) and digital versatile disks (DVDs), magneto-optical media, e.g., floptical disks, and hardware devices configured to store and execute program commands, for example, programming modules, e.g., read only memories (ROMs), random access memories (RAMs), flash memories, etc. Also, the program command may include not only machine code created by a compiler but also high-level programming language executable by a computer using an interpreter. The above-described hardware apparatuses may be configured to operate as one or more software modules to perform operations according to various embodiments of the present disclosure, or vise versa. A module or programming module according to various embodiments of the present disclosure may include at least one of the above-described elements or the at least one of the above-described elements may be omitted or additional other elements may be further included. According to various embodiments of the present disclosure, operations may be performed by modules, programming modules, or other elements in a sequential, parallel, iterative, or heuristic method. Also, some operations may be performed in a different order, omitted, or other operations may be added thereto. It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

The invention claimed is:

1. An optical lens assembly comprising:
a bending portion comprising a reflection surface for reflecting light and at least one surface having refractive power; and
a plurality of lenses arranged between the bending portion and an image plane,
wherein the bending portion has positive refractive power,
wherein the bending portion comprises an object side surface convex towards an object side and an image side surface convex towards an image side,
wherein the optical lens assembly satisfies following inequalities:

$0.06 \leq Id/f \leq 0.2$, $TTL/f \leq 1.0$, and $ttl_a/ttl_b \leq 0.4$, wherein "Id" denotes an image height, "f" denotes a total focal length of the optical lens assembly, "TTL" denotes a total length of the optical lens assembly, "$ttl_a$" denotes a distance along an optical axis from an object side surface to the reflection surface of the bending portion, and "$ttl_b$" denotes a distance along the optical axis from the reflection surface of the bending portion to the image plane.

2. The optical lens assembly of claim 1, wherein all of the plurality of lenses include plastic.

3. The optical lens assembly of claim 1, wherein the bending portion includes plastic.

4. The optical lens assembly of claim 1, wherein, among the plurality of lenses, a first lens located closest to an object side has an Abbe number less than about 35, and a second lens located next to the first lens has an Abbe number greater than or equal to about 50.

5. The optical lens assembly of claim 4, wherein the second lens has positive refractive power, a third lens next to the second lens has negative refractive power, and the second lens and the third lens perform focusing and anti-hand shaking.

6. The optical lens assembly of claim 1, wherein the image height Id is less than or equal to about 4 mm.

7. The optical lens assembly of claim 1, wherein, among the plurality of lenses, a lens located closest to an image side has positive refractive power.

8. The optical lens assembly of claim 1, wherein the bending portion has at least one of positive refractive power or negative refractive power.

9. An optical lens assembly comprising:
a bending portion comprising a reflection surface for reflecting light and at least one surface having refractive power; and
a plurality of lenses arranged between the bending portion and an image plane,
wherein the bending portion has an Abbe number greater than or equal to about 50,
wherein the optical lens assembly satisfies following inequalities:

$0.06 \leq Id/f \leq 0.2$, $TTL/f \leq 1.0$, and $ttla/ttlb \leq 0.4$, and wherein "Id" denotes an image height, "f" denotes a total focal length of the optical lens assembly, "TTL" denotes a total length of the optical lens assembly, "ttla" denotes a distance along an optical axis from an object side surface to the reflection surface of the bending portion, and "ttlb" denotes a distance along the optical axis from the reflection surface of the bending portion to the image plane.

10. An optical lens assembly comprising:
a bending portion configured to bend an optical path by reflecting light; and
six or more lenses arranged between the bending portion and an image plane,
wherein the bending portion has positive refractive power,
wherein the bending portion comprises an object side surface convex towards an object side and an image side surface convex towards an image side, and
wherein, when a distance from an object side surface of a lens located closest to an object side among the six or more lenses to an image plane is TTL, and a focal length is f, the optical lens assembly satisfies relation $0.75 \leq TTL/f \leq 1.0$.

11. The optical lens assembly of claim 10, wherein the bending portion comprises a reflection mirror.

12. The optical lens assembly of claim 10, wherein, when an image height is Id, relation $0.06 \leq Id/f \leq 0.2$ is satisfied.

13. An electronic apparatus comprising:
a first optical lens assembly having a first field of view; and
a second optical lens assembly having a second field of view greater than the first field of view,
wherein the first optical lens assembly comprises:
a bending portion comprising a reflection surface for reflecting light and at least one surface having refractive power, and
a plurality of lenses arranged between the bending portion and an image plane,
wherein the first optical lens assembly satisfies following inequalities:

$0.06 \leq Id/f \leq 0.2$, $TTL/f \leq 1.0$, and $ttl_a/ttl_b \leq 0.4$, wherein "Id" denotes an image height, "f" denotes a total focal length of the first optical lens assembly, "TTL" denotes a total length of the first optical lens assembly, "$ttl_a$" denotes a distance along an optical axis from an object side surface to the reflection surface of the bending portion, and "$ttl_b$" denotes a distance along the optical axis from the reflection surface of the bending portion to the image plane.

14. The electronic apparatus of claim 13, wherein a first image captured by the first optical lens assembly and a second image captured by the second optical lens assembly are synthesized to generate a third image having a third field of view between the first field of view and the second field of view.

* * * * *